US 9,273,768 B2

(12) United States Patent
Beck

(10) Patent No.: US 9,273,768 B2
(45) Date of Patent: Mar. 1, 2016

(54) MULTI-STAGE POWER-SHIFT TRANSMISSION

(71) Applicant: ZF Friedrichshafen AG, Friedrichshafen (DE)

(72) Inventor: Stefan Beck, Eriskirch (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 14/410,734

(22) PCT Filed: May 3, 2013

(86) PCT No.: PCT/EP2013/059203
§ 371 (c)(1),
(2) Date: Dec. 23, 2014

(87) PCT Pub. No.: WO2014/000925
PCT Pub. Date: Jan. 3, 2014

(65) Prior Publication Data
US 2015/0126324 A1 May 7, 2015

(30) Foreign Application Priority Data
Jun. 26, 2012 (DE) .......................... 10 2012 210 829

(51) Int. Cl.
*F16H 37/04* (2006.01)
*F16H 3/66* (2006.01)
*F16H 3/72* (2006.01)
*B60K 6/48* (2007.10)

(52) U.S. Cl.
CPC ................ *F16H 37/042* (2013.01); *B60K 6/48* (2013.01); *F16H 3/66* (2013.01); *F16H 3/725* (2013.01); *B60K 2006/4825* (2013.01); *F16H 2200/0008* (2013.01); *F16H 2200/0065* (2013.01); *F16H 2200/0082* (2013.01);
(Continued)

(58) Field of Classification Search
None
See application file for complete search history.

(56) References Cited

U.S. PATENT DOCUMENTS

| 7,819,772 | B2 | 10/2010 | Tenberge |
| 2004/0147358 | A1* | 7/2004 | Biermann .................... 475/275 |
| 2012/0053003 | A1* | 3/2012 | Hwang ........................ 475/271 |

(Continued)

FOREIGN PATENT DOCUMENTS

| DE | 102007014150 A1 | 9/2008 |
| DE | 202008017570 | 5/2010 |

(Continued)

OTHER PUBLICATIONS

PCT/EP2013/059203 International Search Report Jul. 12, 2013 (3 pages).

*Primary Examiner* — Justin Holmes
(74) *Attorney, Agent, or Firm* — Dority & Manning, P.A.

(57) ABSTRACT

Power-shiftable multi-speed transmission in planetary design for a vehicle for an arrangement between an input shaft and an output shaft, characterized in that the multi-speed transmission features two parallel shaft trains, six shifting elements, at least two spur gear stages and three planetary gear sets, each with one sun gear, one ring gear and one planetary carrier with several planetary gears, whereas the planetary carrier is consolidated into one carrier, and that the two shaft trains are connectable to each other through at least two spur gear stages, whereas, through a selective intervening of the six shifting elements, different transmission ratio relationships can be brought out between the input shaft and output shaft, such that a multitude of forward gears, in particular nine forward gears, and at least one reverse gear, are able to be realized.

21 Claims, 13 Drawing Sheets

(52) U.S. Cl.
CPC .. *F16H 2200/201* (2013.01); *F16H 2200/2046* (2013.01); *Y02T 10/6221* (2013.01); *Y02T 10/6252* (2013.01)

(56) References Cited

U.S. PATENT DOCUMENTS

2012/0088626 A1* 4/2012 Phillips .................. 475/275
2012/0088627 A1* 4/2012 Phillips .................. 475/275
2012/0094799 A1* 4/2012 Phillips .................. 475/275

FOREIGN PATENT DOCUMENTS

| | | | |
|---|---|---|---|
| DE | 102009018958 A1 | * | 2/2011 |
| JP | 200310301 | | 11/2000 |
| JP | 2009191885 | | 8/2009 |
| JP | 2009191885 A | * | 8/2009 |
| WO | WO2012/053003 A8 | | 4/2012 |

* cited by examiner

| Gang | geschlossene Schaltelemente | | | | | | Über-setzung | Gang-sprung |
|---|---|---|---|---|---|---|---|---|
| | Bremse | | Kupplung | | | | | |
| | B1 | B2 | K1 | K2 | K3 | K4 | i | φ |
| 1 | | X | | | X | X | 5,531 | |
| 2 | | | | X | X | X | 3,228 | 1,713 |
| 3 | | X | | X | | X | 2,232 | 1,446 |
| 4 | | | X | X | | X | 1,619 | 1,379 |
| 5 | | X | X | X | | | 1,207 | 1,341 |
| 6 | | | X | X | X | | 1,000 | 1,207 |
| 7 | | X | X | | X | | 0,862 | 1,160 |
| 8 | X | | X | | X | | 0,722 | 1,194 |
| 9 | X | X | X | | | | 0,815 | 1,174 |
| R | X | X | | | | X | -5,165 | 8,993 / -0,934 |
| M4' | X | | X | | | X | 1,619 | |
| M4" | | | X | | X | X | 1,619 | |
| M4'" | | X | X | | | X | 1,619 | |

Fig. 3

MULTI-STAGE POWER-SHIFT TRANSMISSION

FIELD OF INVENTION

The present invention relates to a power-shiftable multi-speed transmission of planetary design for a vehicle that can be used, for example, as an automatic transmission.

BACKGROUND

Power-shiftable multi-speed transmissions are used as gearboxes in drive trains of vehicles. Such multi-speed transmissions feature several transmission stages and several shifting elements and are found in designs for passenger cars with up to eight forward gears for front-transverse installation or for longitudinal installation. For producing the transmission ratios, there are power-shiftable multi-speed transmissions with spur gear shifting elements and with planetary gear stages. Multi-speed transmissions are generally automatic transmissions, which are shifted with friction elements or shifting elements such as clutches and brakes. Typically, such multi-speed transmissions are connected to a start-up element, such as a hydrodynamic torque converter or a fluid coupling. The start-up element is subject to a slip effect, and is optionally equipped with a lock-up clutch. The known transmission concepts feature specific advantages and specific disadvantages, such that they are of interest only for certain applications.

The patent specification U.S. Pat. No. 7,819,772 B2 discloses a power-shiftable multi-speed transmission between an input shaft and an output shaft. The multi-speed transmission features several transmission stages and several shifting elements.

SUMMARY OF THE INVENTION

The present subject matter provides an improved power-shiftable multi-speed transmission of planetary design for a vehicle Additional objectives and advantages of the invention set will be set forth in part in the following description, or may be obvious from the description, or may be learned through practice of the invention.

A power-shiftable multi-speed transmission of planetary design between an input shaft and an output shaft, in particular an automatic transmission for a vehicle, according to an exemplary embodiment of the present subject matter features two parallel shaft trains, six shifting elements, at least two spur gear stages and three planetary gear sets, each with one sun gear, one ring gear and one planetary carrier with several planetary gears. The planetary carrier may be consolidated into one bar. The two shaft trains are connectable to each other through at least two spur gear stages. Through a selective intervening of the six shifting elements, different transmission ratio relationships can be brought out between the input shaft and output shaft. As a result, a multitude of forward gears, for example at least nine forward gears, and at least one reverse gear, are able to be realized.

The vehicle may be a motor vehicle, such as a passenger car, a truck or a commercial vehicle. The vehicle may be equipped with an internal combustion engine and, at the same time or as an alternative, with an electric drive; thus, it may be designed as a hybrid vehicle. The allocation of the coupled planetary gear stages to only two shaft trains leads to a short structural length and also to a compact overall arrangement.

A shifting element may be, depending on the embodiment, a clutch or a brake. A shifting element may be designed as a frictional-locking shifting element or as a positive-locking shifting element. A shifting element that is used may be formed as a power-shifting clutch or a power-shifting brake. In particular, a shifting element may be designed as a force-fitting clutch or as a force-fitting brake, such as a multi-disk clutch, a band brake or a cone coupling. Furthermore, a shifting element may be designed as a positive-locking brake or a positive-locking coupling, such as a synchronization or a claw coupling. Shifting elements of various types may be used for the six shifting elements of the multi-speed transmission.

For the spur gear stages and the planetary gear sets, use may be made of known arrangements. For example, the multi-speed transmission may feature exactly two spur gear stages, not more than two spur gear stages, exactly three spur gear stages, or not more than three spur gear stages. Regarding the planetary gear sets, the multi-speed transmission may feature, for example, exactly three planetary gear sets, or not more than three planetary gear sets.

For front-transverse drive vehicles, in particular, a parallel arrangement of the two shaft trains is advantageous. Thus, the input shaft and the output shaft may be arranged in a manner parallel to each other. Advantageously, the multi-speed transmission features a short axial design, which is ideal for the front-transverse design. In addition, multi-stage transmissions are characterized by low construction effort, low costs and low weight and a good transmission ratio series, low absolute rotational speeds, low relative rotational speeds, low planetary set torques and low shifting element torques, good gearing efficiency and a compact design.

In accordance with one exemplary embodiment of the present subject matter, the multi-speed transmission comprises a 9-gear planetary power-shifting transmission. Through a corresponding arrangement of the planetary gear sets and the shifting elements, the multi-speed transmission may be usable as a front-transverse system. The multi-speed transmission may comprise at least nine forward gears. The multi-speed transmission may have three planetary gear sets.

Thus, the power-shiftable multi-speed transmission in planetary design may have at least nine forward gears and one reverse gear, and feature a transmission ratio that is quite suitable for motor vehicles, with a high overall spread along with favorable progressive steps. The multi-speed transmission may enable a high starting transmission ratio in the forward direction, and may contain a direct gear. Thereby, the multi-speed transmission requires only low construction costs, and is particularly characterized by a small number of shifting elements, and avoids double gearshifts upon a sequential shifting operation. Through this, if there are gearshifts in defined gear groups, only a previously closed shifting element can be opened, and a previously open shifting element can be closed.

Regarding the multi-speed transmission, two exemplary arrangements can be implemented; these are hereinafter designated as the "first main system" and the "second main system." In the first main system, the three planetary gear sets are arranged on the first shaft train. In the second main system, two of the three planetary gear sets are arranged on the first shaft train and one of the three planetary gear sets is arranged on the second shaft train, whereas, compared to the first main system, an additional spur gear stage is required.

Additional or different arrangement variants can be implemented for the two main systems. For this purpose, shifting elements may be arranged in one power path of the multi-speed transmission equally effective at different points of the power path. In particular, for the shifting elements designated below as the first and fourth shifting element, various coupling options arise at the various shafts of the multi-speed transmission. Thus, an entire family of multi-speed transmissions can be realized.

The following describes exemplary embodiments of the first main system.

The three planetary gear sets and the input shaft may be arranged on a first shaft train of the two parallel shaft trains. The output shaft may be arranged on a second shaft train of the two parallel shaft trains. The two parallel shaft trains may be connectable to each other through the two spur gear stages. A sun gear of a second planetary gear set of the three planetary gear sets and the input shaft may be connected to each other in a torque-proof or slip-proof manner with a first connection element. A sun gear of a first planetary gear set of the three planetary gear sets and a carrier of the second planetary gear set may be connected to each other with a second connection element. A ring gear of a third planetary gear set of the three planetary gear sets and the carrier of the second planetary gear set may be connected to each other in a torque-proof manner with a third connection element. A ring gear of the second planetary gear set and a first spur gear of a second spur gear stage of at least two spur gear stages may be connected to each other with a fourth connection element. A first spur gear of a first spur gear stage of at least two spur gear stages and a ring gear of the first planetary gear set may be connected to each other with a fifth connection element. A second spur gear of the first spur gear stage and the output shaft may be connected to each other with a sixth connection element. A carrier of the first planetary gear set and the input shaft may be connected to each other with a seventh connection element. A second spur gear of the second spur gear stage and the output shaft may be connected to each other with an eighth connection element. A second shifting element of the six shifting elements may be arranged in the power flow between the input shaft and a carrier of the third planetary gear set. A third shifting element of the six shifting elements may be arranged in the power flow between the fourth connection element and the carrier of the third planetary gear set. A fifth shifting element of the six shifting elements may be arranged in the power flow between the carrier of the third planetary gear set and a transmission housing. A sixth shifting element of the six shifting elements may be arranged in the power flow between the sun gear of the third planetary gear set and the transmission housing.

"In the power flow" can be understood to mean that a force can be transferred through the particular shifting element if the particular shifting element is closed. However, if the shifting element is open, such that no power can be transferred through the particular shifting element, the power flow may be interrupted.

A connection element can be understood to be a shaft. Depending on the embodiment, a connection element either can be understood to be a rigid element, or can be understood to be an element composed of at least two part elements coupled by a coupling. Thus, two elements connected by means of one connection element may be connected to each other in a torque-proof manner and form, for example, a rigid shaft. Alternatively, a connection element may feature a coupling. In principle, a freewheel for the housing or for another shaft may be arranged at any shaft of the multi-speed transmission shaft.

For the first main system, one of the shifting elements may be arranged at different points of the power flow paths, without causing a change to the transmission ratios or a shifting matrix. Thus, in various exemplary embodiments of the present subject matter, the first and the fourth shifting element can be positioned at different points of the power flow paths in the multi-speed transmission through shifting elements. The following exemplary embodiments may also arise for the first main system.

In one exemplary embodiment of the first main system, the seventh connection element may include a first shifting element of the six shifting elements. Thereby, the first shifting element may be arranged in the power flow between the input shaft and the carrier of the first planetary gear set.

In an additional exemplary embodiment of the first main system, the second connection element may include the first shifting element. Thereby, the first shifting element may be arranged in the power flow between the carrier of the second planetary gear set and the sun gear of the first planetary gear set.

In an additional exemplary embodiment of the first main system, the fifth connection element may include the first shifting element. Thereby, the first shifting element may be arranged in the power flow between a ring gear of the first planetary gear set and a first spur gear of the first spur gear stage.

In an additional exemplary embodiment of the first main system, the sixth connection element may include the first shifting element. Thereby, the first shifting element may be arranged in the power flow between a second spur gear of the first spur gear stage and the output shaft.

The following describes exemplary embodiments of the second main system.

In contrast to the first main system, for the second main system, one of the planetary gear sets may be arranged on the second shaft train. Thereby, the planetary gear set, arranged on the second shaft train, can be, in at least two ways, coupled to the spur gear stage with a uniform level of stationary transmission ratios and level of gear ratios of the second main system.

In accordance with exemplary embodiments of the second main system, two planetary gear sets and the input shaft may be arranged on a first shaft train of the two parallel shaft trains. A first planetary gear set of the three planetary gear sets and the output shaft may be arranged on a second shaft train of the two parallel shaft trains. The two parallel shaft trains may be connectable to each other through three spur gear stages. A sun gear of a second planetary gear set of the three planetary gear sets and the input shaft may be connected to each other in a torque-proof manner with a first connection element. A ring gear of a third planetary gear set of the three planetary gear sets and the carrier of the second planetary gear set may be connected to each other in a torque-proof manner and with a third connection element. A ring gear of the second planetary gear set and a first spur gear of a second spur gear stage of at least two spur gear stages may be connected with a fourth connection element. A second spur gear of the second spur gear stage and the output shaft may be connected with an eighth connection element. The carrier of the second planetary gear set and a first spur gear of a fourth spur gear stage of at least two spur gear stages may be connected to each other in a torque-proof manner with a ninth connection element. The output shaft and the ring gear of the first planetary gear set may be connected in a torque-proof manner with a tenth connection element. A first spur gear of a third spur gear stage of at least two spur gear stages and the input shaft may be connected to each other with a thirteenth connection element. The input shaft is connectable to the carrier of the third planetary gear set by means of a second shifting element of the six shifting elements. The carrier of the third planetary gear set with the connection of the first spur gear of the second spur gear stage is connectable to the ring gear of the second planetary gear set by means of a third shifting element of the six shifting elements. A fifth shifting element of the six shifting elements may be arranged in the power flow between the carrier of the third planetary gear set and the transmission housing. A sixth shifting element of the six shifting elements may be arranged in the power flow between the sun gear of the third planetary gear set and the transmission housing. A second spur gear of the fourth spur gear stage and the carrier of the first planetary gear set may be connected with an eleventh connection element. A second spur gear of the third spur gear stage and the sun gear of the first planetary gear set may be connected with a twelfth connection element.

In accordance with alternative exemplary embodiments of the second main system, two planetary gear sets and the input shaft can be arranged on a first shaft train of the two parallel shaft trains. A first planetary gear set of the three planetary gear sets and the output shaft may be arranged on a second shaft train of the two parallel shaft trains. The two parallel shaft trains may be connectable to each other through three spur gear stages. A sun gear of a second planetary gear set of the three planetary gear sets and the input shaft may be connected to each other in a torque-proof manner with a first connection element. A ring gear of a third planetary gear set of the three planetary gear sets and the carrier of the second planetary gear set may be connected to each other in a torque-proof manner with a third connection element. A ring gear of the second planetary gear set and a spur gear of a second spur gear stage of at least two spur gear stages may be connected to each other with a fourth connection element. A second spur gear of the second spur gear stage and the output shaft may be connected with an eighth connection element. The carrier of the second planetary gear set and a first spur gear of a fourth spur gear stage of at least two spur gear stages may be connected in a torque-proof manner with a ninth connection element. The output shaft and the ring gear of the first planetary gear set may be connected in a torque-proof manner with a tenth connection element. A first spur gear of a third spur gear stage of at least two spur gear stages and the input shaft may be connected with a thirteenth connection element. The input shaft may be connectable to the carrier of the third planetary gear set by means of a second shifting element of the six shifting elements. The carrier of the third planetary gear set with the connection of the first spur gear of the second spur gear stage is connectable to the ring gear of the second planetary gear set by means of a third shifting element of the six shifting elements. A fifth shifting element of the six shifting elements may be arranged in the power flow between the carrier of the third planetary gear set and the transmission housing. A sixth shifting element of the six shifting elements may be arranged in the power flow between the sun gear of the third planetary gear set and the transmission housing. A second spur gear of the fourth spur gear stage and the sun gear of the first planetary gear set may be connected with an eleventh connection element. A second spur gear of the third spur gear stage and the carrier of the first planetary gear set may be connected with a twelfth connection element.

As discussed above with respect to the first main system, equally effective, alternative design variants of the second main system arise through the repositioning of shifting elements on one power path for the second main system. Thus, the first shifting element may be positioned equally effectively on at least five points, and the fourth shifting element may be positioned equally effectively on at least two points.

Thus, in accordance with one exemplary embodiment of the second main system, the thirteenth connection element may feature a first shifting element of the six shifting elements. Thereby, the first shifting element may be arranged in the power flow between the input shaft and the first spur gear of the third spur gear stage.

In addition, in accordance with an additional exemplary embodiment of the second main system, the twelfth connection element may include a first shifting element of the six shifting elements.

In addition, in accordance with an additional exemplary embodiment of the second main system, the eleventh connection element may include a first shifting element of the six shifting elements.

In addition, in accordance with an additional exemplary embodiment of the second main system, the tenth connection element may include a first shifting element of the six shifting elements.

In addition, in accordance with an additional exemplary embodiment of the second main system, the ninth connection element may include a first shifting element.

In addition, in accordance with additional exemplary embodiments of the two main systems, the eighth connection element may include a fourth shifting element of the six shifting elements. Thereby, the fourth element may be arranged in the power flow between the second spur gear of the second spur gear stage and the output shaft.

In addition, in accordance with additional exemplary embodiments of the two main systems, the fourth connection element may include a fourth shifting element of the six shifting elements. Thereby, the fourth shifting element may be arranged in the power flow between the ring gear of the second planetary gear set and the first spur gear of the second spur gear stage.

The hybridization of vehicles is gaining increasing importance.

In accordance with one exemplary embodiment, a power source may be arranged on the input shaft. The power source may comprise a motor, for example an electric motor. The power source may be arranged axially parallel to the input shaft. In an additional embodiment, the power source may be arranged directly on the input shaft.

An additional advantage of the present subject matter is that an additional electric motor can be installed at each shaft as a generator and/or as an additional drive motor. As already described, in principle, an electric motor or another power source may be arranged on each shaft, also known as a connection element. However, a link with the input shaft appears sensible, in particular for the electric motor. It may be connected to the input shaft either directly or axially parallel through a pair of gears. These variants are possible for all represented concepts In accordance with exemplary embodiments, all three planetary gear sets are designed, for example, as "negative planetary gear sets," the respective ring gears of which, with carriers that are held down, rotate in a direction opposite to the sun gears.

In one exemplary embodiment of the present invention, at least one planetary gear set may be designed as a "positive planetary gear set," if the described carrier and ring gear connection of the planetary gear set is exchanged and the stationary transmission ratio is adjusted. A positive planetary gear set designates a planetary transmission whose ring gear rotates with the same direction of rotation as the sun gear, if the carrier is held down. A negative planetary gear set features, on one planetary carrier, rotatably mounted planetary gears, which mesh with the sun gear and ring gear of the negative planetary gear set, such that, with a planetary carrier that is held down and a rotating sun gear, the ring gear rotates in a direction opposite to the direction of rotation of the sun gear. A positive planetary gear set features, on one planetary carrier, inner and outer planetary gears that are rotatably mounted and meshed with each other, whereas the sun gear of the positive planetary gear set meshes with the inner planetary gears and the ring gear of this planetary gear set meshes with the outer planetary gears, such that, with a planetary carrier that is held down and a rotating sun gear, the ring gear rotates in a direction that is the same as the direction of rotation of the sun gear.

For the various exemplary embodiments, it is generally the case that everywhere where binding ability is allowed for, individual or multiple negative planetary gear sets may be converted into positive planetary gear sets, if, at the same time, the carrier connection and the ring gear connection are exchanged, and the amount of the stationary transmission ratio is increased by one.

In accordance with one exemplary embodiment, the first forward gear of the multi-speed transmission may arise from the locking of the third, fourth and sixth shifting elements. The second forward gear may arise from the locking of the second, third and fourth shifting elements. The third forward gear may arise from the locking of the second, fourth and sixth shifting elements. The fourth forward gear may arise from the locking of the first, second and fourth shifting elements. The fifth forward gear may arise from the locking of the first, second and sixth shifting elements. The sixth forward gear may arise from the locking of the first, second and third shifting elements. The seventh forward gear may arise from the locking of the first, third and sixth shifting elements. The eighth forward gear may arise from the locking of the first, third and fifth shifting elements. The ninth forward gear may arise from the locking of the first, fifth and sixth shifting elements. The reverse gear may arise from the locking of the fourth, fifth and sixth shifting elements.

The multi-speed transmission may consist of an input-side first shaft train and an output-side second shaft train. These two shaft trains may be connected by at least two power paths, to which the at least two spur gear stages may belong. If power paths are separated by couplings, these may occur equivalently at any point within the power path. If such power paths are connectable to the transmission housing through brakes, such brakes may engage equivalently at other points within the power path. Identical stationary transmission ratios may be produced through different planetary transmission structures, which should then apply as equivalent within the sense of this invention.

BRIEF DESCRIPTION OF THE DRAWINGS

The invention is more specifically illustrated as an example on the basis of the attached drawings. The following is shown:

FIG. 3 an exemplary circuit diagram of a multi-speed transmission in accordance with one embodiment of the present invention;

DETAILED DESCRIPTION

Figure 1:
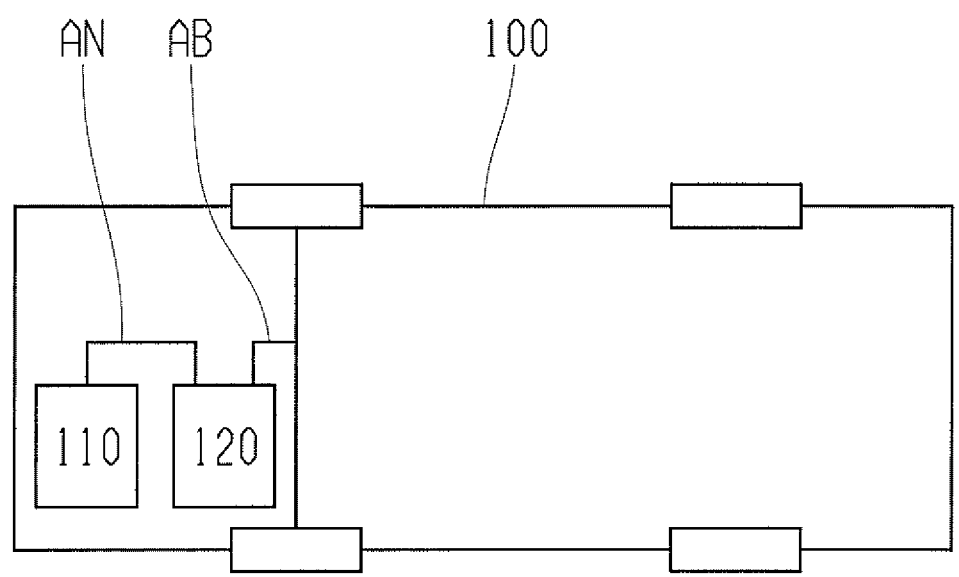
FIG. 1 a schematic representation of a vehicle with a power-shiftable multi-speed transmission in accordance with one exemplary embodiment of the present invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

In the following description of the preferred embodiments of the present invention, elements shown in the various figures and elements having similar effects use the same or similar reference signs, whereas a repeated description of such elements is omitted.

Figure 2:
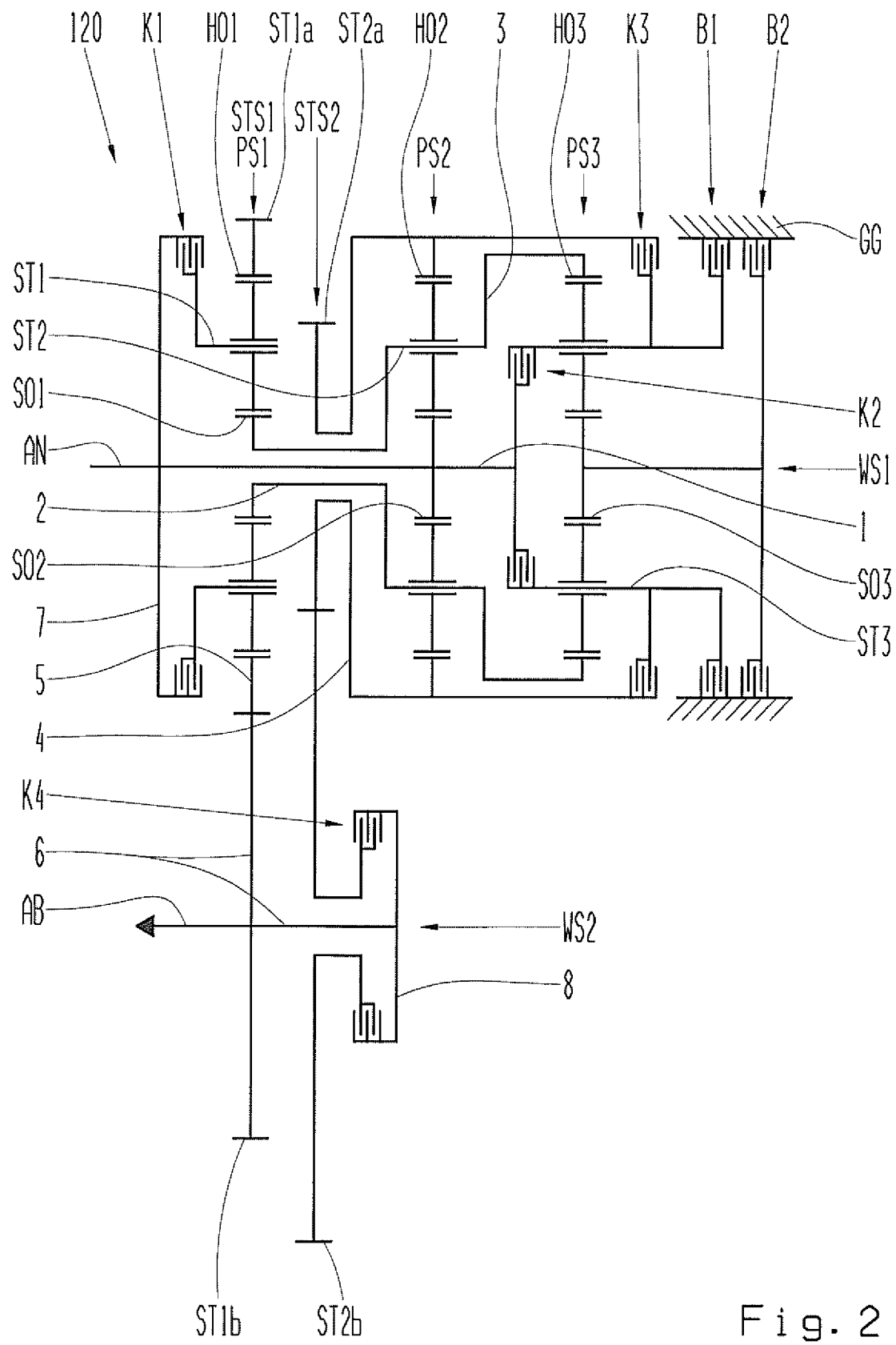
FIG. 2 a transmission scheme of a 9-gear multi-speed transmission in accordance with one exemplary embodiment of the present invention.
Figure 9:
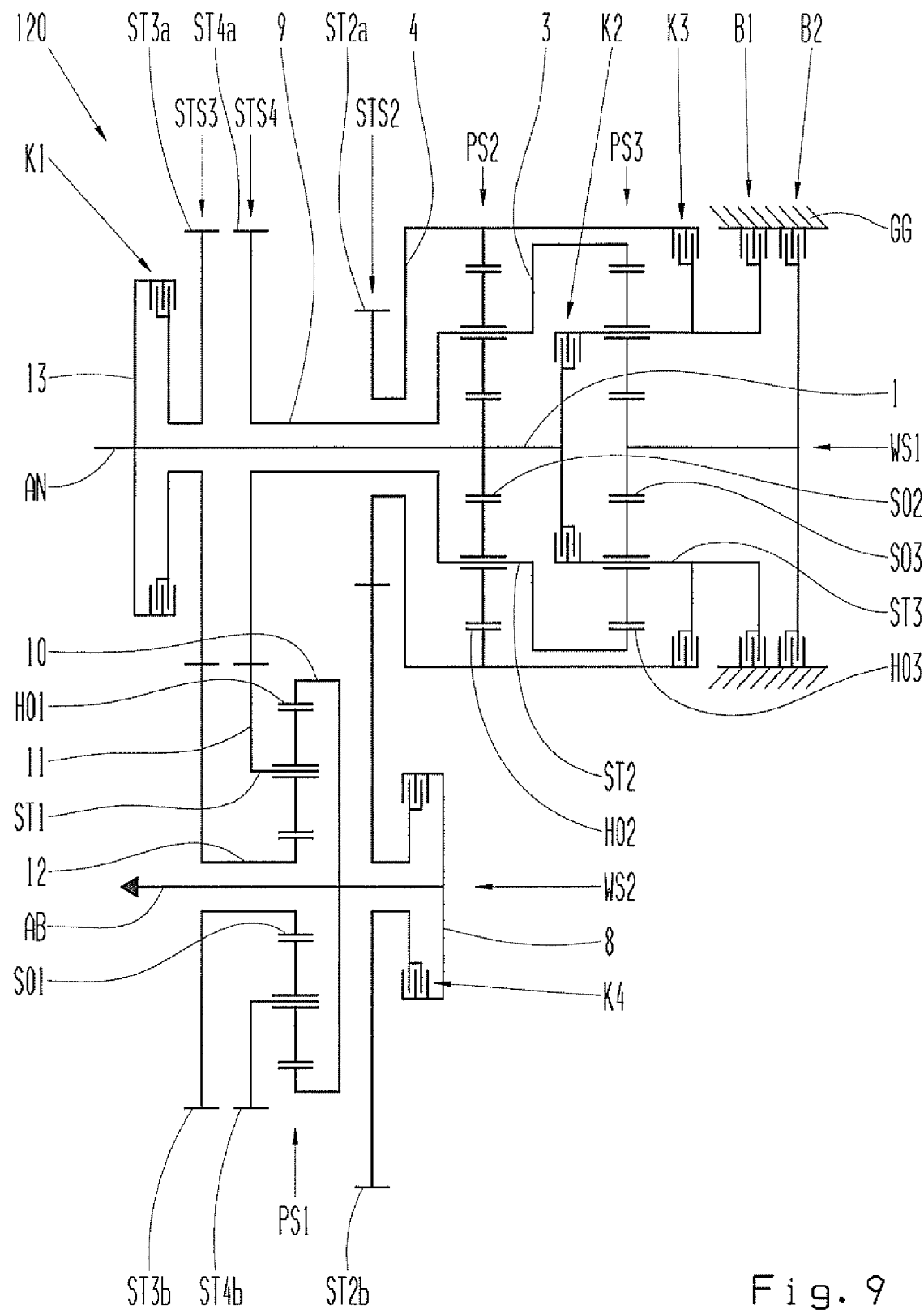
FIG. 9 representation of a second main system in accordance with one exemplary embodiment of the present invention.
Figure 10:
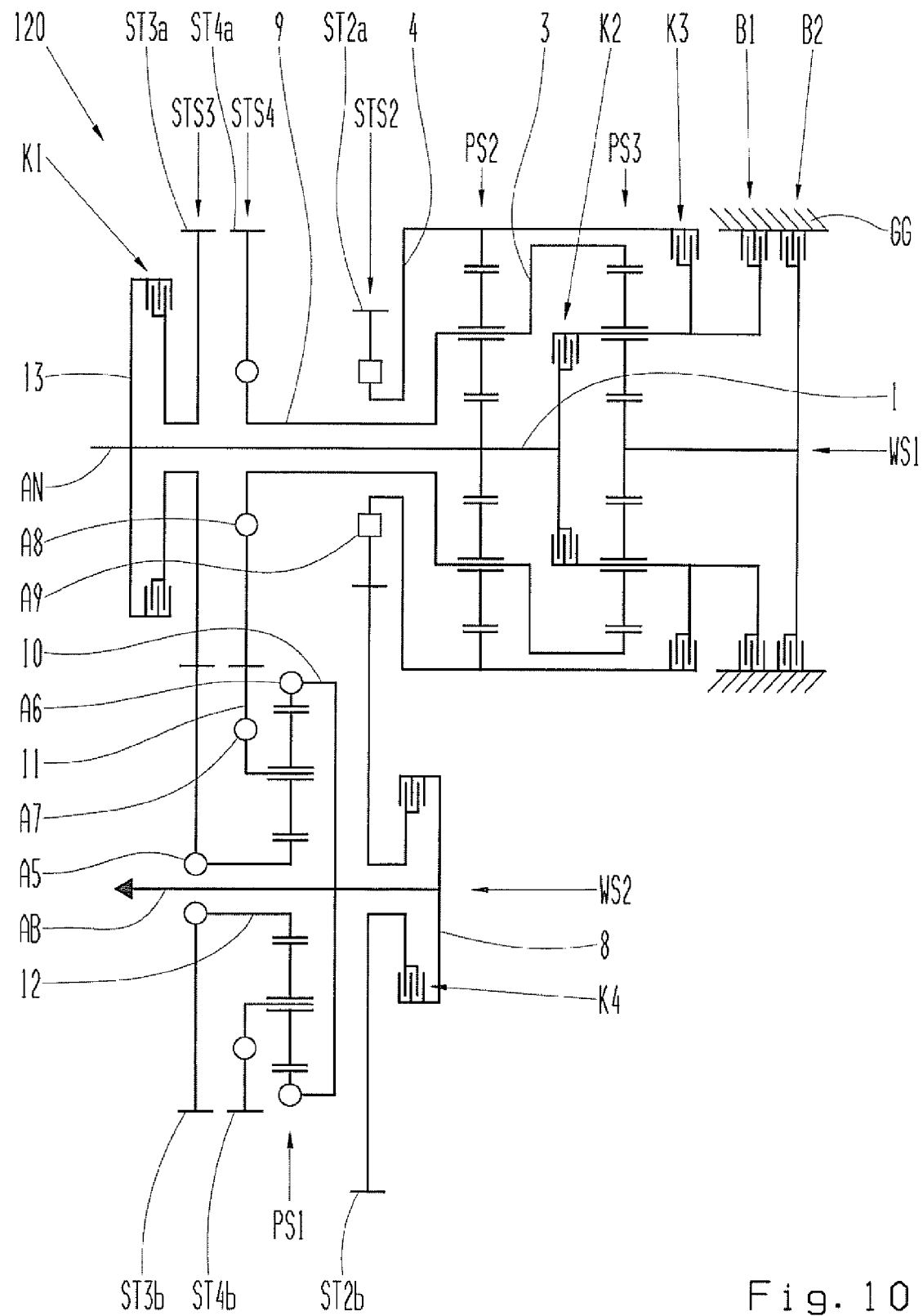
FIG. 10 design variants of the second main system of a multi-speed transmission in accordance with one exemplary embodiment of the present invention.
Figure 11:
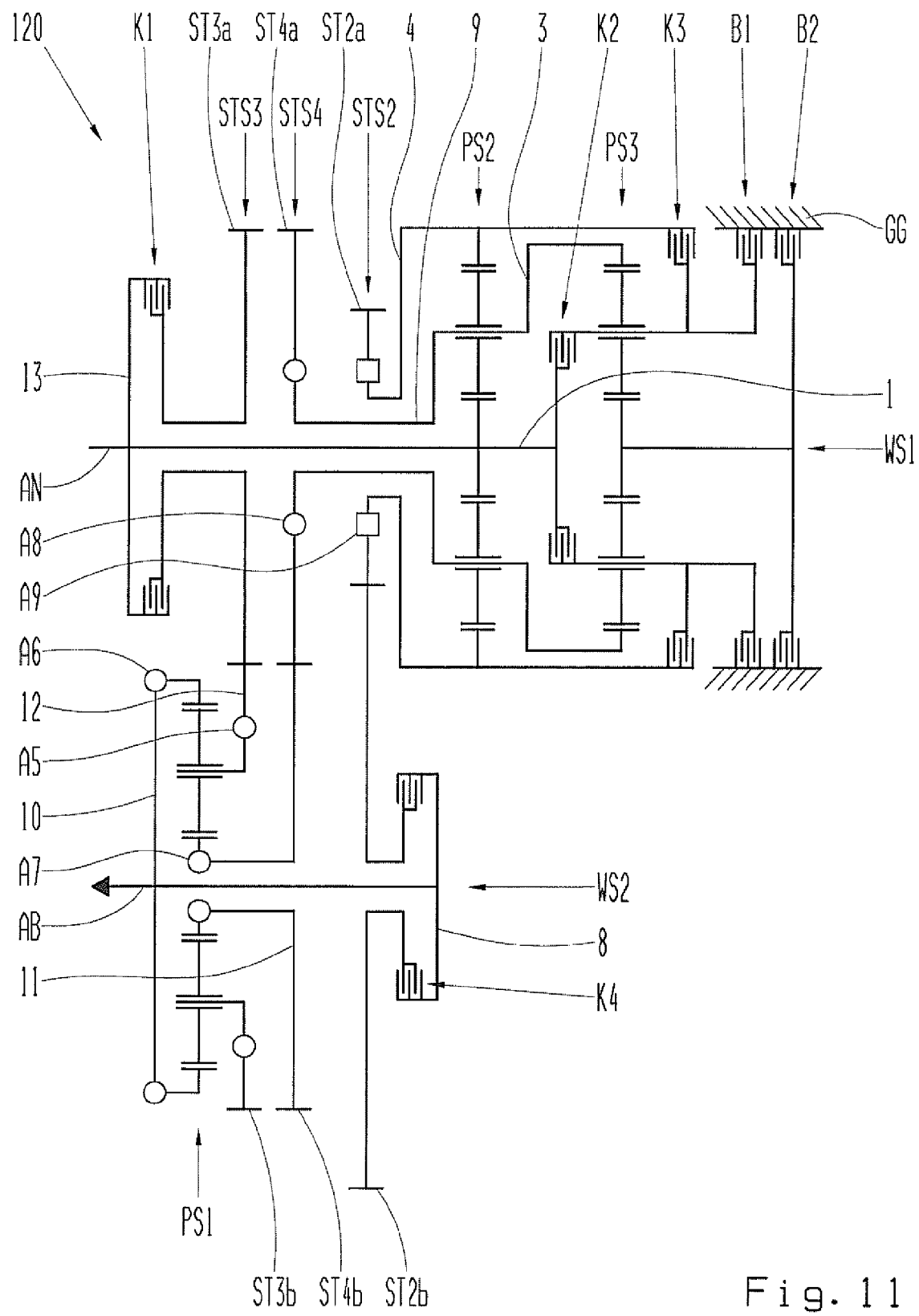
FIG. 11 a transmission scheme of the second main system in accordance with an additional exemplary embodiment of the present invention.
Figure 12:
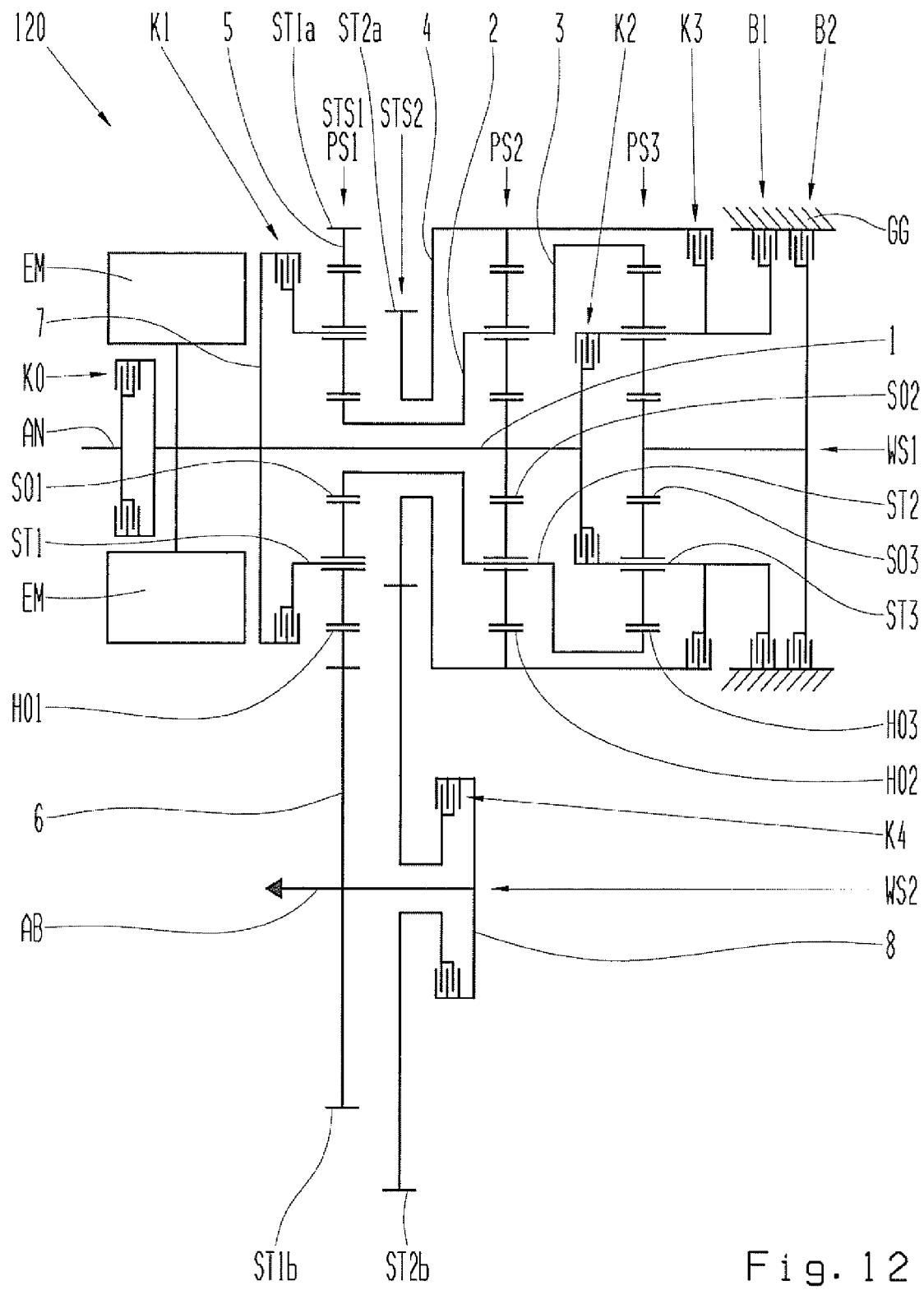
FIG. 12 a schematic representation of the first main system with a power source in accordance with one exemplary embodiment of the present invention.
Figure 13:
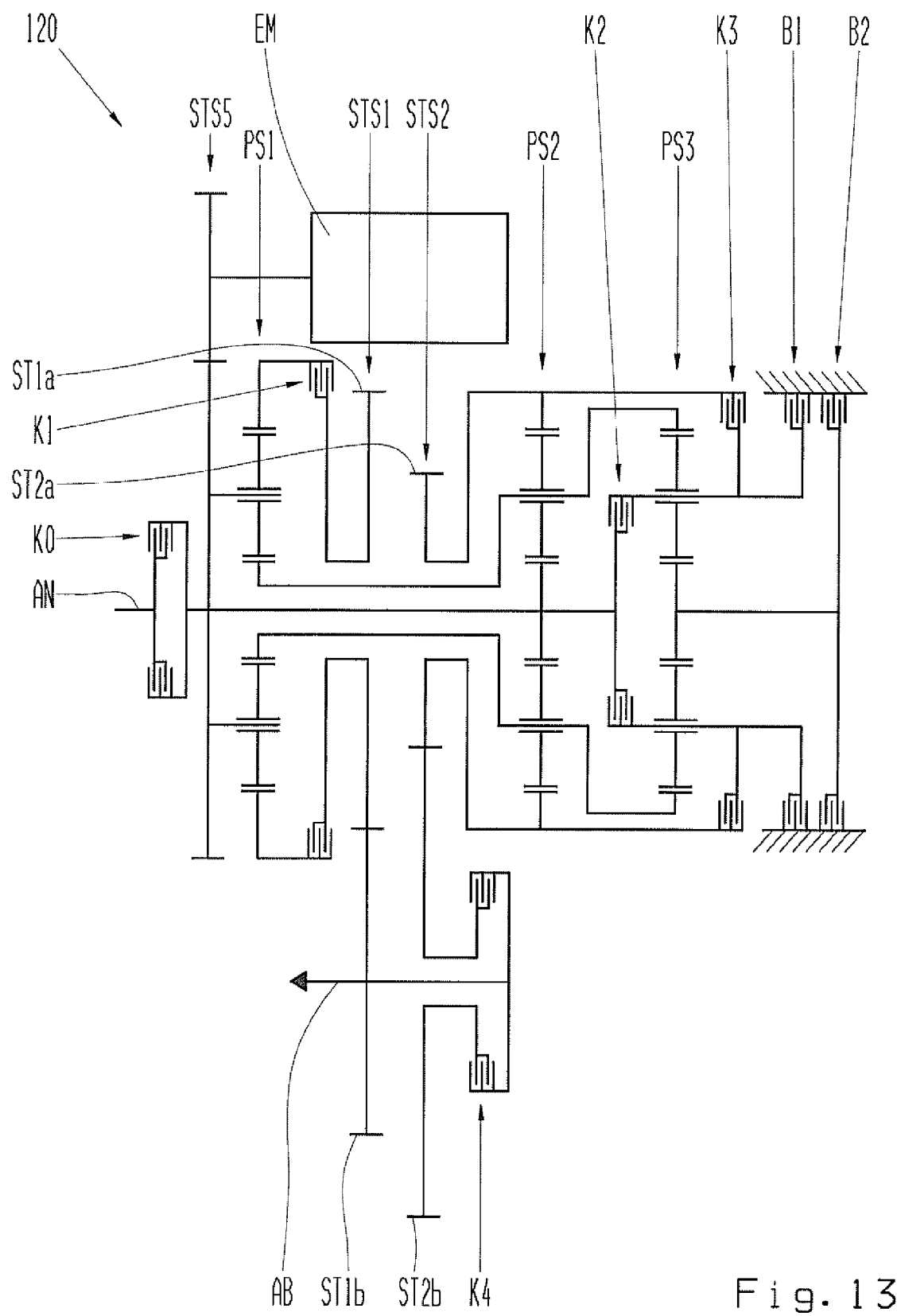
FIG. 13 a schematic representation of a multi-speed transmission with a power source in accordance with one exemplary embodiment of the present invention.

The following provides, on the basis of FIG. 1, an overview regarding the use of a power-shiftable multi-speed transmission. FIG. 2 presents a first main system of a power-shiftable multi-speed transmission as one exemplary embodiment of the present invention, which is subsequently described, on the basis of FIGS. 4, 5, 6, 7 and 8, in different blocking variants. A second main system of a power-shiftable multi-speed transmission and different arrangement and blocking variants thereof are represented in FIGS. 9, 10 and 11. FIGS. 12 and 13 show a hybridization of a power-shiftable multi-speed transmission as an example of the first main system. FIG. 3 shows shifting matrix for a power-shiftable multi-speed transmission in accordance with an exemplary embodiment of the invention.

FIG. 1 shows a schematic representation of a vehicle 100 with a motor 110 and a power-shiftable multi-speed transmission 120 of planetary design in accordance with one exemplary embodiment of the present invention. In accordance with such exemplary embodiment, the power-shiftable multi-speed transmission 120, also called a planetary power-shifting transmission or a power-shifting unit, is installed in front-transverse design in the vehicle 100. The motor 110, for example an internal combustion engine, is connected to the power-shiftable multi-speed transmission 120 through an input shaft AN. An output shaft AB of the power-shiftable multi-speed transmission 120 connects the power-shiftable multi-speed transmission 120 to the front axle of the vehicle 100, in order to drive the vehicle 100.

In accordance with one exemplary embodiment, the power-shiftable multi-speed transmission 120 includes three planetary gear sets, two or three spur gear stages and six shifting elements, thereof four clutches and two brakes, whereas two shifting elements are to be shifted at the same time. The power-shiftable multi-speed transmission 120 does not feature fixed housing couplings, and may shift nine forward gears and one reverse gear. A hydrodynamic torque converter, a hydrodynamic coupling, an additional starting coupling, an integrated starting coupling or brake, an additional electric motor or a power shuttle unit or power reverser unit may serve as a start-up element.

FIG. 2 shows a transmission scheme of a power-shiftable multi-speed transmission 120 in accordance with one exemplary embodiment of the present invention. The exemplary embodiment shown in FIG. 2 shows one exemplary embodiment of the multi-speed transmission 120 designated as the first main system. The power-shiftable multi-speed transmission 120 may comprise multi-speed transmission 120 shown on the basis of FIG. 1. In accordance with this exemplary embodiment, the multi-speed transmission 120, also called a planetary power-shifting transmission, is realized as a 9-gear multi-speed transmission.

The multi-speed transmission 120 includes two parallel shaft trains WS1, WS2, six shifting elements K1, K2, K3, K4, B1, B2, two spur gear stages STS1, STS2 and three planetary gear sets PS1, PS2, PS3, which are all arranged in a transmission housing GG of the multi-speed transmission 120. In this exemplary embodiment, all three planetary gear sets PS1, PS2, PS3 are formed as negative planetary gear sets, the respective ring gears HO1, HO2, HO3 of which, with carriers ST1, ST2, ST3 that are held down, rotate in a direction opposite to the sun gears SO1, SO2, SO3. A negative planetary gear set features, on one planetary carrier, rotatably mounted planetary gears, which mesh with the sun gear and ring gear of this planetary gear set. The three planetary gear sets PS1, PS2, PS3 are arranged in an axial direction in the order of "PS1, PS2, PS3", coaxially in a row, on the first shaft train WS1 of the two parallel shaft trains WS1, WS2.

A first spur gear ST1a of a first spur gear stage STS1 of the two spur gear stages STS1, STS2, and a first spur gear ST2a of a second spur gear stage STS2 of the two spur gear stages STS1, STS2 are coaxially in a row on the first shaft train WS1 between the first planetary gear set PS1 and the second planetary gear set PS2.

The input shaft AN is arranged on the first shaft train WS1, the output shaft AB is arranged on a second shaft train WS2 of the two parallel shaft trains WS1, WS2. Furthermore, the two shaft trains WS1, WS2 are connected to each other through the two spur gear stages STS1, STS2.

The shifting elements K1, K2, K3, K4 are formed as clutches, the two shifting elements B1, B2 are formed as brakes, and are hereinafter sometimes designated as such. Through a selective intervening of the six shifting elements K1, K2, K3, K4, B1, B2, different transmission ratios can be brought about between the input shaft AN and the output shaft AB. In this manner, at least nine forward gears and at least one reverse gear are able to be realized.

The following describes a coupling of the individual elements of the three planetary gear sets PS1, PS2, PS3 with each other, at the two spur gear stages STS1, STS2 and at the input shaft AN and at the output shaft AB.

The multi-speed transmission 120 features at least eight connection elements, which are designated with 1 to 8. The connection elements 1, 2, 3, 4, 5, 6, 7, 8 may be formed as shafts, whereas, within one connection element 1, 2, 3, 4, 5, 6, 7, 8, one or more shifting elements may also be arranged, as described in more detail below.

As FIG. 2 shows, a sun gear SO2 of a second planetary gear set PS2 of the three planetary gear sets PS1, PS2, PS3 and the input shaft AN are connected to each other in a torque-proof manner with a first connection element 1. A sun gear SO1 of a first planetary gear set of the three planetary gear sets PS1, PS2, PS3 and a carrier ST2 of the second planetary gear set PS2 are connected to each other with a second connection element 2. A ring gear HO3 of a third planetary gear set PS3 of the three planetary gear sets PS1, PS2, PS3 and the carrier ST2 of the second planetary gear set PS2 are connected to each other in a torque-proof manner with a third connection element. A ring gear HO2 of the second planetary gear set PS2 is connected to spur gear ST2a of the second spur gear stage STS2 with a fourth connection element 4. The first spur gear ST1a of the spur gear stage STS1 is connected to a ring gear HO1 of the first planetary gear set PS1 with a fifth connection element 5. A second spur gear ST1b of the first spur gear stage STS1 and the output shaft AB are connected with a sixth connection element 6. A carrier ST1 of the first planetary gear set PS1 is connected to the input shaft AN with a seventh connection element 7. A second spur gear ST2b of the second spur gear stage STS2 and the output shaft AB are connected with an eighth connection element 8.

The seventh connection element 7 features a first shifting element K1 of the six shifting elements K1, K2, K3, K4, B1, B2, whereas the first shifting element K1 is arranged in the power flow between the input shaft AN and the carrier ST1 of the first planetary gear set PS1. A second shifting element K2 of the six shifting elements K1, K2, K3, K4, B1, B2 is arranged in the power flow between the input shaft AN and a carrier ST3 of the third planetary gear set PS3. A third shifting element K3 of the six shifting elements K1, K2, K3, K4, B1, B2 is arranged in the power flow between the torque-proof connection of the ring gear HO2 of the second planetary gear set PS2 to the spur gear ST2a of the second spur gear stage STS2 and the carrier ST3 of the third planetary gear set PS3. The eighth connection element 8 features a fourth shifting element K4 of the six shifting elements K1, K2, K3, K4, B1, B2, whereas the fourth shifting element K4 is arranged in the power flow between the second spur gear ST2b of the spur gear stage STS2 and the output shaft AB. A fifth shifting element B1 of the six shifting elements K1, K2, K3, K4, B1, B2 is arranged in the power flow between the carrier ST3 of the third planetary gear set PS3 and a transmission housing GG. A sixth shifting element B2 of the six shifting elements K1, K2, K3, K4, B1, B2 is arranged in the power flow between the sun gear SO3 of the third planetary gear set PS3 and the transmission housing GG.

In a manner corresponding to the spatial arrangement of the three planetary gear sets and the two first spur gears of two spur gear stages, viewed in an axial direction in the sequence of "PS1/ST1a, ST2a, PS2, PS3", the first connection element 1 of the multi-speed transmission 120 runs centrally within the second connection element 2 in sections. Thereby, the second connection element 2 runs centrally within the fourth connection element 4 in sections. In addition, the seventh connection element with the first shifting element K1 fully encompasses the input shaft AN or the first connection element 1, as the case may be, in an axial direction. The third connection element 3 fully encompasses the second shifting element K2 in an axial direction. The first spur gear ST1a of the first spur gear stage is radially arranged around the first planetary gear set PS1.

The fifth shifting element B1 and the sixth shifting element B2, thus the two brakes B1, B2, are spatially arranged, viewed axially, directly next to each other in an area outside of the sequence of "PS1/ST1a, ST2a, PS2, PS3" in addition to the third planetary gear set PS3. Thereby, the fifth shifting element B1 is arranged between the third planetary gear set PS3 and the sixth shifting element B2. The fifth and the sixth shifting elements B1 and B2 are connected to the transmission housing GG. In this example of an arrangement, the kinematic connection of the fifth and sixth shifting elements B, B2 on the third planetary gear set PS3 brings about the fact that the shifting element B1 is arranged closer to the third planetary gear set PS3, than the shifting element B2.

The spatial arrangement of the shifting elements B1, B2 shown in FIG. 2 is understood to be one example. Thus, the shifting element B1 may be also arranged, for example, at least in part radially around the shifting element B2.

In the exemplary embodiment shown in FIG. 2, the third shifting element K3 is arranged axially directly next to the fifth shifting element B1. The connection of the ring gear HO2 of the second planetary gear set PS2 to the third shifting element K3 completely encompasses the third connection element 3, the second shifting element K2 and the third planetary gear set PS3 in an axial direction. The spatial arrangement of the two second spur gears ST1b, ST2b of the two spur gear stages STS1, STS2 is, in an axial direction, seen on the second shaft train WS2 in the form of "ST1b, ST2b". The fourth shifting element K4 directly axially borders on the second gear ST2b of the second spur gear stage STS2.

In one exemplary embodiment, the first four shifting elements K1, K2, K3, K4, meaning the four clutches, are designed as frictional-locking shiftable multi-disk clutches, but, of course, in an additional embodiment may be designed as a positive-locking shiftable claw coupling or cone coupling. The shifting elements of B1, B2, designed as brakes, are designed as frictional-locking shiftable multi-disk brakes in one embodiment, but, in accordance with other exemplary embodiments, may also be designed as frictional-locking shiftable band brakes or positive-locking shiftable claw brakes or cone brakes.

Several equally effective transmission variants can be derived from the exemplary transmission 120 shown in FIG. 2. For the clutch K1 of the main system shown in FIG. 2, there are three additional equally effective arrangement options; for the clutch K4, there is one additional arrangement variant. This is shown in detail in FIG. 4 below.

FIG. 3 shows an exemplary circuit diagram of a multi-speed transmission in accordance with one exemplary embodiment of the present invention. The multi-speed transmission, or planetary power-shifting transmission, may comprise one of the multi-stage transmissions described above or below.

Viewed from left to right, gear stages that in each case designate one gear of the multi-speed transmission are indicated in the first column of the table shown in FIG. 3. In the following six columns, reserved for the six elements B1, B2, K1, K2, K3, K4, as they were already described (for example) on the basis of FIG. 2, a cross in the table is entered for a closed shifting element B1, B2, K1, K2, K3, K4. Thereby, the two brakes B1 and B2 are first listed, and the four clutches K1, K2, K3, K4 are subsequently listed. For a closed shifting element B1, B2, K1, K2, K3, K4, a power transmission takes place through the respective shifting element B1, B2, K1, K2, K3, K4. Thereby, the respective shifting element B1, B2, K1, K2, K3, K4 may form a rigid connection element. The penultimate column shows a sample transmission ratio i, followed in the last column by a subsequent gear step $\phi$ arising from this. The closed shifting elements marked with an "x" can be described with the English-language expression of "engaged shifting elements". For each gear, three shifting elements B1, B2, K1, K2, K3, K4 are open, and three shifting elements B1, B2, K1, K2, K3, K4 are closed.

In addition to the shifting logic, exemplary values for the respective transmission ratios i of the individual gear stages and the gear steps $\phi$ to be determined from the transmission ratios i can also be seen from the circuit diagram. The specified transmission ratios i arise from the (typical) stationary transmission ratios of the three planetary gear sets PS1, PS2, PS3 of negative 1.600 for the first planetary gear set PS1, negative 1.600 for the second planetary gear set PS2 and negative 3.642 for the third planetary gear set, along with the first spur gear stage STS1 of 1.000 and the second spur gear stage STS2 of 3.228. Thereby, the stationary transmission ratios of the spur gear stage are changeable in a construction-related area of tolerance, without having substantial effects on the transmission ratios. Furthermore, it can be seen from the circuit diagram that, upon a sequential shifting operation, double gearshifts or group gearshifts, as the case may be, may be avoided. Two adjacent gear stages use two of the three necessary shifting elements together. The sixth gear is preferably formed as a direct gear. The specified transmission ratios and sizes derived from them represent a preferred embodiment. The specialist may use other values here, in accordance with the requirements for the multi-speed transmission.

As already described, for example on the basis of FIG. 2, there are six shifting elements K1, K2, K3, K4, B1, B2 arising from the four clutches K1, K2, K3, K4 and the two brakes B1, B2. In the following description, for the first four shifting elements K1, K2, K3, K4, the term "clutches K1, K2, K3, K4" is selected and, for the fifth and sixth shifting elements B1, B2 the term "brakes B1, B2" is selected.

The first forward gear arises from the locking of the brake B2 and the clutches K3, K4, the second forward gear arises from the locking of the clutches K2, K3, K4, the third forward gear arises from the locking of the brake B2 and the clutches K2, K4, the fourth forward gear arises from the locking of the clutches K1, K2, K4, the fifth forward gear arises from the locking of the brake B2 and the clutches K1, K2, the sixth forward gear arises from the locking of the clutches K1, K2, K3, the seventh forward gear arises from the locking of the brake B2 and the clutches K1, K3, the eighth forward gear arises from the locking of the brake B1 and the two clutches K1, K3, and the ninth forward gear arises from the locking of the two brakes B1, B2 and the clutch K1. As the circuit diagram in FIG. 3 also shows, the reverse gear arises from the locking of the two brakes B1, B2 and the clutch K4.

The transmission ratio i can also be described with the term "ratio". For the first gear designated with gear stage 1, a transmission ratio i of 5.531 arises; for the second gear designated with gear stage 2, a transmission ratio i of 3.228 arises; for the third gear, a transmission ratio i of 2.232 arises; for the fourth gear, a transmission ratio i of 1.619 arises; for the fifth gear, a transmission ratio i of 1.207 arises; for the sixth gear, a direct transmission ratio i of 1.000 arises; for the seventh gear, a transmission ratio i of 0.862 arises; for the eighth gear, a transmission ratio i of 0.722 arises; and for the ninth gear, a transmission ratio i of 0.615 arises. As the circuit diagram also shows, a transmission ratio i of negative 5.165 arises for the reverse gear. Consequently, from the first gear to the second gear, a gear step $\phi$, which is also designated with the term "step", of 1.713 arises; from the second gear to the third gear, a gear step $\phi$ of 1.446 arises; from the third gear to the fourth gear, a gear step $\phi$ of 1.379 arises; from the fourth gear to the fifth gear, a gear step $\phi$ of 1.341 arises; from the fifth gear to the sixth gear, a gear step $\phi$ of 1.207 arises; from the sixth gear to the seventh gear, a gear step $\phi$ of 1.160 arises; from the seventh gear to the eighth gear, a gear step $\phi$ of 1.194 arises; from the eighth gear to the ninth gear, a gear step $\phi$ of 1.174 arises. Thus, the transmission features a spread of 8.993. The ratio of the reverse gear to the first gear amounts to negative 0.934, and is thus very close to an ideal value of negative 1.

The multiple gears M4', M4", M4''' listed in the first column are additional shifting combinations, which also constitute the fourth gear. The first multiple gear M4' arises from the locking of the brake B1 and the clutchesK1, K4, the second multiple gear M4' arises from the closing of the clutchesK1, K3, K4, and the third multiple gear M4''' arises from the closing of the brake B2 and the clutchesK1, K4.

In accordance with one exemplary embodiment of the invention, a start of the vehicle, for example the vehicle shown in FIG. 1, is possible with a shifting element integrated into the multi-speed transmission. Thereby, a shifting element that is required in the first forward gear and in the reverse gear is particularly suitable, thus the brake B2 or the clutchK4. Advantageously, the clutchK4 is required in the second forward gear. If the clutchK4 is used as a start-up element integrated in the multi-speed transmission, even a start in the first four forward gears and the reverse gear is possible.

The level of the stationary transmission ratios, and thus the level of the gear ratios, is in principle freely selectable. In accordance with one exemplary embodiment, the preferred transmission ratios of the main system are, for the first planetary set PS1, −1.600, for the second planetary set PS2, −1.600, for the third planetary set PS3 −3.642 and for the spur gear stage STS1 (ST1a-ST1b), 1.000, for the second spur gear stage STS2 (ST2a-ST2b), 3.228 and for the design variants with three spur gear stages shown in FIGS. 9, 10 and 11, for the third spur gear stage STS3 (ST3a-ST3b), 1.000, and for the fourth spur gear stage STS4 (ST4a-ST4b), 1.000. All exemplary embodiments shown in FIGS. 1 and 3-13 give rise to equally effective transmission variants, which may use the same shifting matrix.

The following shows possible blocking variants of the multi-speed transmission 120 shown in FIG. 2 in FIGS. 4, 5, 6, 7 and 8. The spatial arrangement of the shifting elements K1, K2, K3, K4, B, B2 of the exemplary embodiment of a multi-speed transmission 120 shown in FIG. 2 may be, in principle, arbitrarily within the multi-speed transmission 120, and is limited only by the dimensions and the external shaping of the transmission housing GG. Accordingly, the following figures show exemplary component/arrangement variants of the multi-speed transmission 120 in accordance with FIG. 2, whereas all kinematic couplings of the planetary gear sets, spur gear stages, shifting elements and shafts, or connection elements, are taken from FIG. 2 among each other without any change.

Figure 4:
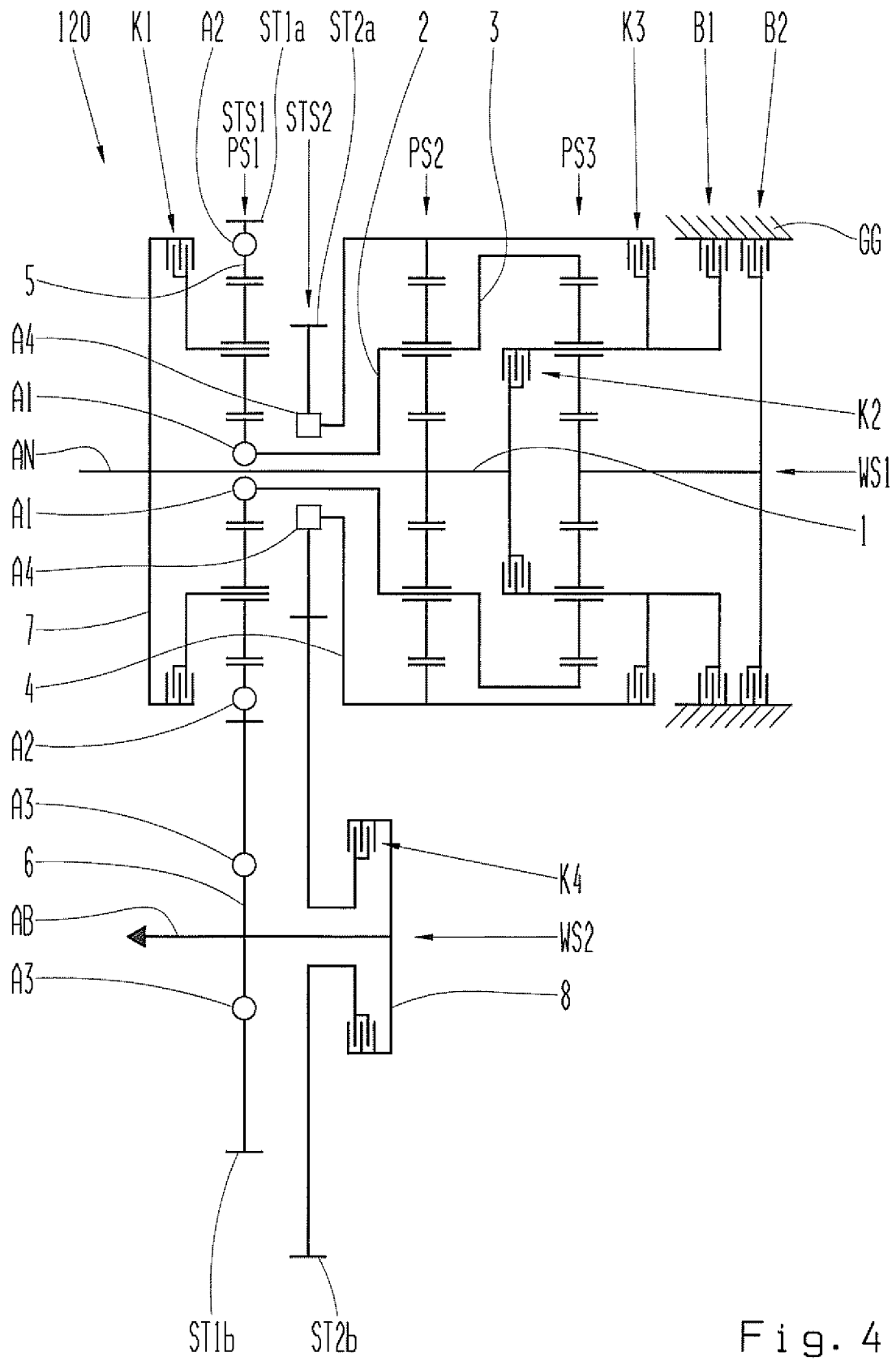
FIG. 4 design variants of a first main system of a multi-speed transmission in accordance with one exemplary embodiment of the present invention.

FIG. 4 shows an overview of blocking variants of the first main system of a multi-speed transmission 120, already described on the basis of FIG. 2, in accordance with different exemplary embodiments of the present invention.

The transmission scheme shown in FIG. 4 corresponds to the transmission scheme of a multi-speed transmission 120 shown in FIG. 2, from which several equally effective transmission variants can be derived, whereas, for the first shifting element K1 or the clutchK1, three additional equally effective arrangement variants are shown and, for the fourth shifting element K4 or the clutchK4, one additional arrangement variant is shown.

In FIG. 4, the three arrangement variants for the clutchK1 are designated with A1, A2, A3, the arrangement variant for the clutchK4 is designated with A4.

A first arrangement variant A1 of the clutchK1 is an arrangement of the clutchK1 on the second connection element 2 between the sun gear SO1 of the first planetary gear set and the carrier ST2 of the second planetary gear set PS2. In the first arrangement variant A1, the first shifting element K1 is arranged in the power flow between the carrier ST2 of the second planetary gear set PS2 and the sun gear SO1 of the first planetary gear set PS1.

A second arrangement variant A2 of the clutchK1 is an arrangement of the clutchK1 on the fifth connection element 5 between the ring gear HO1 of the first planetary gear set and the first spur gear ST1a of the first spur gear set STS1. In the second arrangement variant A2, the first shifting element K1 is arranged in the power flow between a ring gear HO1 of the first planetary gear set PS1 and a first spur gear ST1a of the first spur gear stage STS1.

A third arrangement variant A3 of the clutchK1 is an arrangement of the clutchK1 on the sixth connection element 6 between the second spur gear ST1b of the first spur gear stage STS1 and the output shaft AB. In the third arrangement version A3, the first shifting element K1 is arranged in the power flow between a second spur gear ST1b of the first spur gear stage STS1 and the output shaft AB.

In one arrangement variant A4 of the clutchK4, the fourth connection element 4 features the clutchK4. In the arrangement variant A4 of the clutchK4, the fourth shifting element K4 is arranged in the power flow between the ring gear HO2 of the second planetary gear set PS2 and the first spur gear ST2a of the second spur gear stage STS2.

If the clutchK1 in accordance with the first arrangement variant A1 is arranged in the second connection element 2, the seventh connection element 7 produces a torque-proof connection between the input shaft AN and the carrier of ST1 of the first planetary gear set PS1, and the sun gear SO1 of the first planetary gear set is able to be coupled to the carrier ST2 of the second planetary gear set through the clutchK1. Thereby, all eight combinations of the position displayed in FIG. 2 for the clutchK1 and the three arrangement variants A1, A2, A3 for the clutchK1 with the position displayed in FIG. 2 for the clutchK4 and the arrangement variant A4 for the clutchK4 are shown. In the following FIGS. 5, 6, 7 and 8, one of the possible arrangement variants A1, A2, A3, A4 is shown for the clutchesK1 and K4 respectively.

Figure 5:
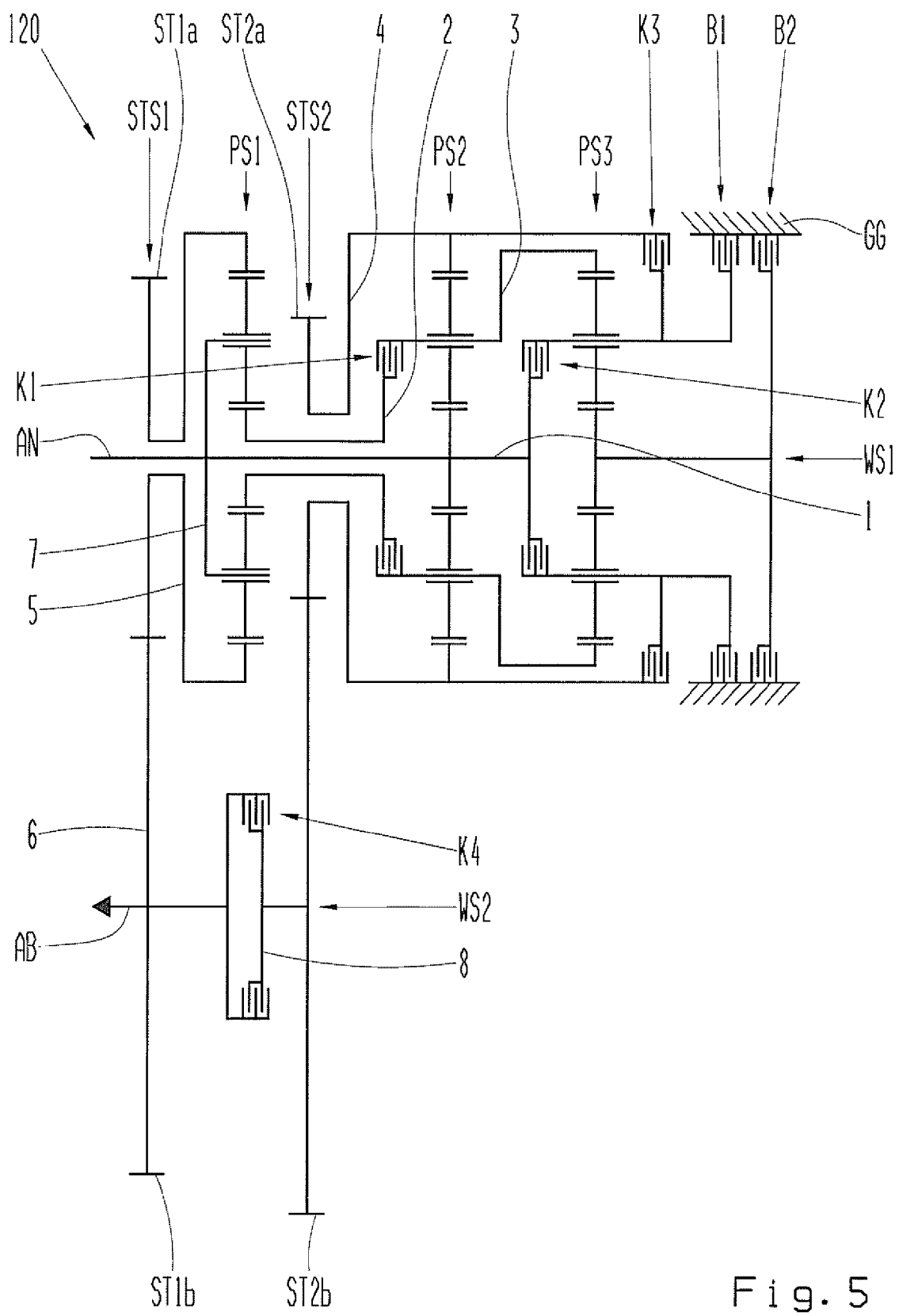
FIGS. 5, 6, 7 and 8 schematic representations of the first main system in accordance with exemplary embodiments of the present invention.

FIG. 5 shows a schematic representation of an additional exemplary embodiment of the first main system of the multi-speed transmission 120 already described on the basis of FIG. 2. The first arrangement variant for the clutchK1, designated as A1 in FIG. 4, is shown. Thereby, compared to the transmission shown in FIG. 4, the first spur gear stage STS1 is axially shifted and arranged on the opposite side of the first planetary gear set PS1 in relation to the second planetary gear set PS2.

In the exemplary embodiment shown in FIG. 5, the carrier ST2 of the first planetary gear set PS1 is connected in a torque-proof manner to the input shaft AN or to the sun gear SO2 of the second planetary gear set PS2. Through the clutchK1, the sun gear SO1 of the first planetary gear set PS1 and the carrier ST2 of the second planetary gear set PS2 can be coupled. Through the axial shifting of the first spur gear stage STS1, the seventh connection element 7 runs centrally within the fifth connection element 5. In addition, the axial shifting of the first spur gear stage STS1 allows for smaller spur gears with the same stationary transmission ratio, and thus shaft trains WS1, WS2 that are arranged closer to each other in parallel. The shaft trains W1, WS2, arranged closer to each other compared to FIG. 2, allow for a more compact design. In the exemplary embodiment shown in FIG. 5, the clutchK4 is arranged between the second spur gear ST1b of the first spur gear stage STS1 and the second spur gear ST2b of the second spur gear stage STS2.

Figure 6:
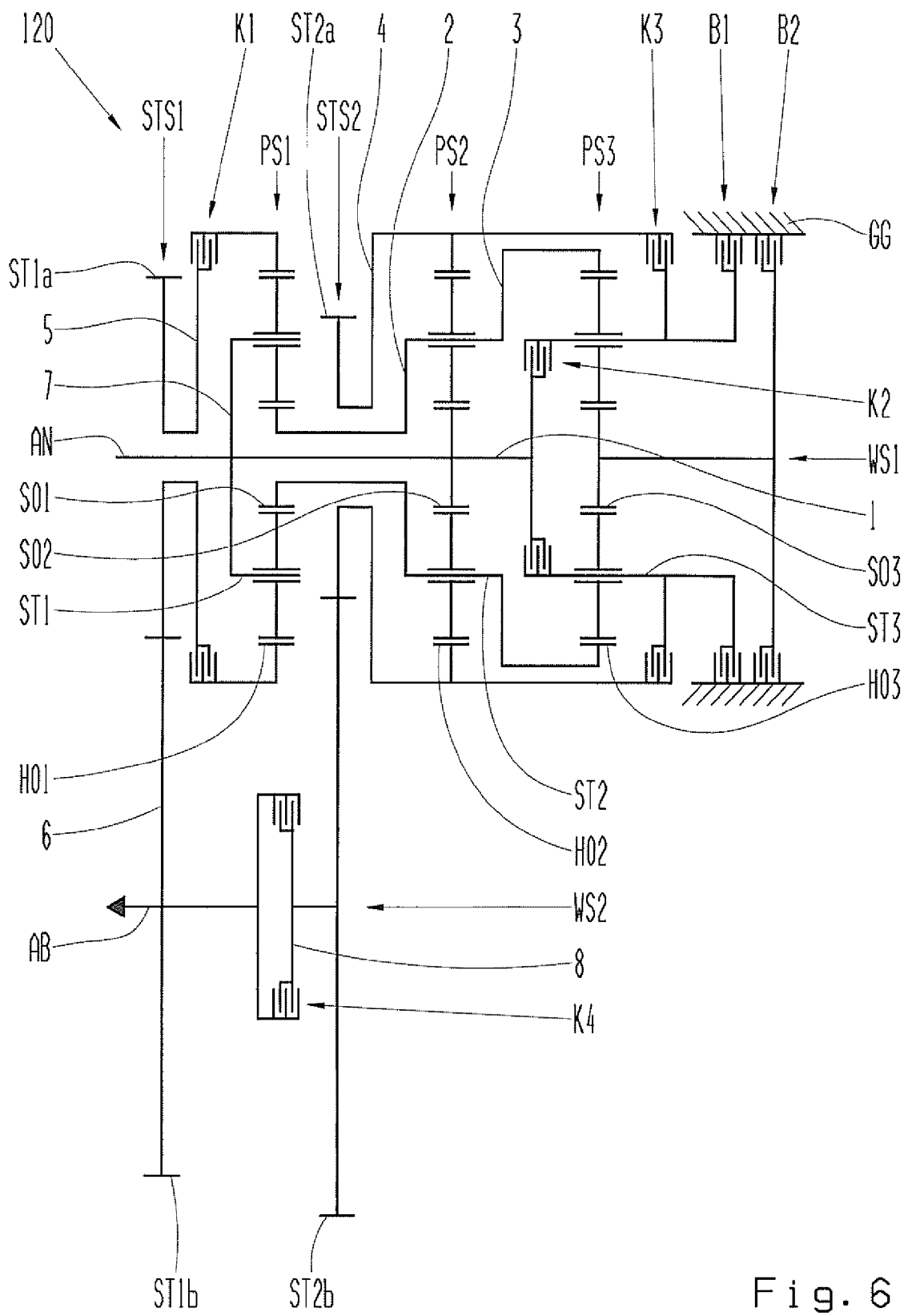

FIG. 6 shows a schematic representation of an additional example of an arrangement of the first main system of the multi-speed transmission 120 already described on the basis of FIG. 2. The second arrangement variant for the clutchK1, designated as A2 in FIG. 4, is shown.

In the exemplary embodiment shown in FIG. 6, the arrangement of the first spur gear stage STS1 and the fourth shifting element K4 correspond to the arrangement variant already shown in FIG. 6. The input shaft AN is connected in a torque-proof manner to the carrier ST1 of the first planetary gear set PS1. The sun gear SO1 of the first planetary gear set PS1 is connected in a torque-proof manner to the carrier ST2 of the second planetary gear set PS2. The first spur gear ST1a of the first spur gear stage STS1 is able to be coupled to the ring gear HO1 of the first planetary gear set PS1 through the first shifting element K1.

Figure 7:
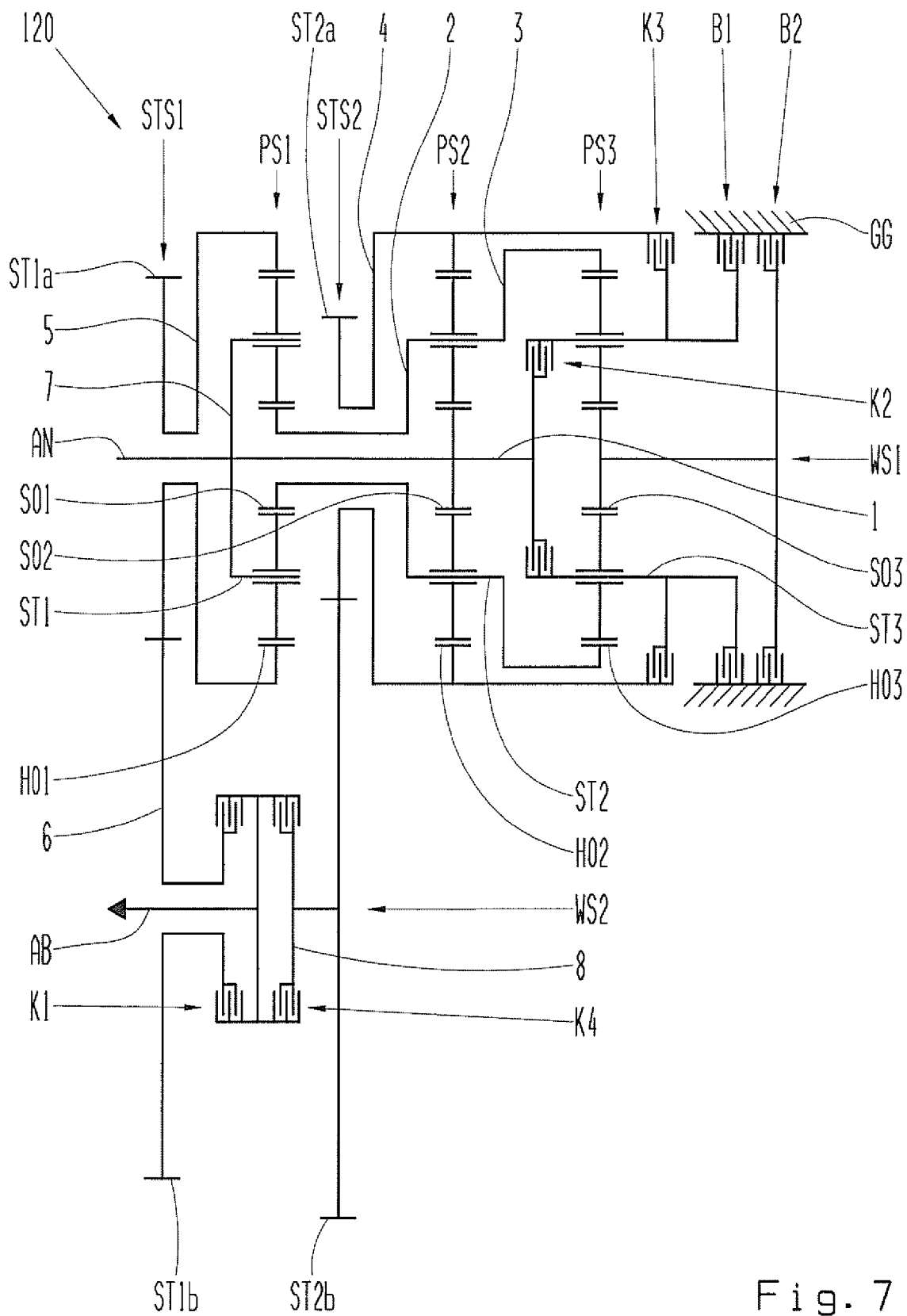

FIG. 7 shows a schematic representation of an additional example of an arrangement of the first main system of the multi-speed transmission 120 already described on the basis of FIG. 2. The third arrangement variant for the clutchK1, designated as A3 in FIG. 4, is shown.

In the exemplary embodiment shown in FIG. 7, the second spur gear ST1b of the first spur gear stage STS1 is able to be coupled to the output shaft AB through the clutchK1. The arrangement of the first spur gear stage STS1 and the fourth clutchK4 correspond to the arrangement variant shown in FIGS. 5 and 6. The clutchK1 and the clutchK4 are arranged next to each other, whereas one clutch of the two clutchesK1, K4 is connected in a torque-proof manner to the output shaft AB. The first spur gear ST1a of the first spur gear stage STS1 is connected in a torque-proof manner to the ring gear HO1 of the first planetary gear set PS1.

Figure 8:
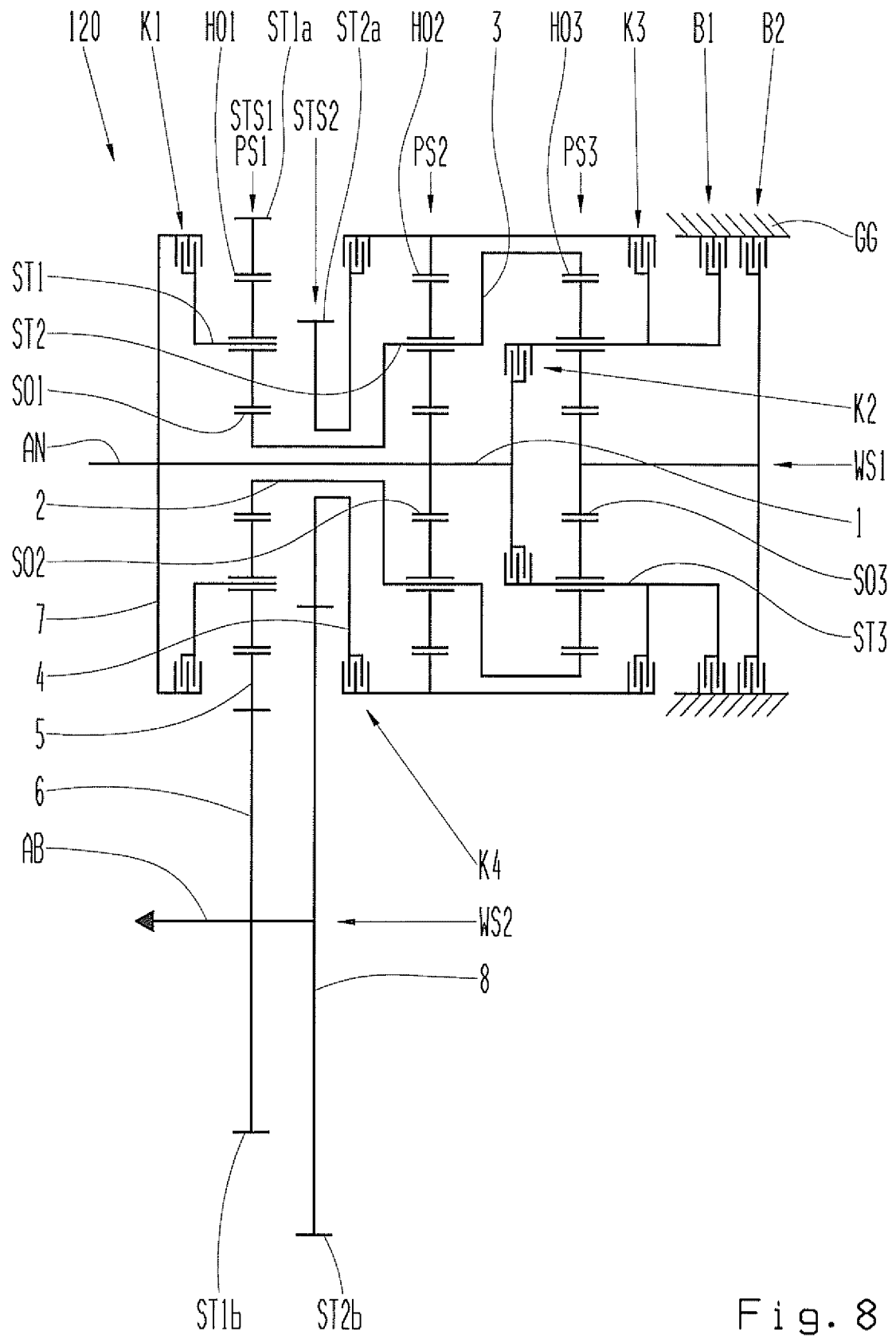

FIG. 8 shows a schematic representation of an additional example of an arrangement of the first main system of the multi-speed transmission 120 already described on the basis of FIG. 2. The arrangement variant for the clutchK4, designated as A4 in FIG. 4, is shown.

In the exemplary embodiment shown in FIG. 8, the clutchK4 is arranged between the first spur gear ST2a of the second spur gear stage STS2 and the ring gear HO2 of the second planetary gear set PS2. Thus, the ring gear HO2 of the second planetary gear set PS2 and the first spur gear ST2a of the second spur gear stage STS2 are able to be coupled through the clutchK4. In this arrangement variant, the second spur gear ST2b of the second spur gear stage STS2 is connected in a torque-proof manner with the output shaft AB. The transmission elements and couplings, which are no longer listed here, correspond to the representation in FIG. 4.

The power-shiftable multi-speed transmission 120 shown in FIGS. 2, 4, 5, 6, 7 and 8 may be realized equally effectively through an arrangement of the first planetary gear set PS1 on the output shaft AB. The following FIGS. 9, 10 and 11 show two arrangement variants and possible alternative blocking variants of a multi-speed transmission 120 in accordance with exemplary embodiments of the invention with a planetary gear set on the output shaft AB. Such a multi-speed transmission 120 is hereinafter designated as the second main system.

FIG. 9 shows a transmission scheme of a power-shiftable multi-speed transmission 120 in accordance with one exemplary embodiment of the present invention. The exemplary embodiment is based on the specified second main system of a multi-speed transmission 120. The power-shiftable multi-speed transmission 120 may comprise the multi-speed transmission 120 shown in FIG. 1. In accordance with this embodiment, the multi-speed transmission 120, also called a planetary power-shifting transmission, is realized as a 9-gear multi-speed transmission.

Compared to the exemplary embodiments of a multi-speed transmission 120 shown in FIGS. 2, 4, 5, 6, 7 and 8, the multi-speed transmission 120 shown in FIG. 9 does not feature a first spur gear stage STS1, but features, in addition to the second spur gear stage STS2 already described on the basis of FIG. 2, two additional spur gear stages STS3, STS4. Thus, instead of two spur gear stages STS1, STS2, as shown, for example, in FIG. 2 for the first main system, three spur gear stages STS2, STS3, STS4 are then used. In this exemplary embodiment, the first planetary gear set PS1 is positioned on the output shaft AB.

The multi-speed transmission 120 shown in FIG. 9 comprises two parallel shaft trains WS1, WS2, six shifting elements K1, K2, K3, K4, B1, B2, three spur gear stages STS2, STS3, STS4 and three planetary gear sets PS1, PS2, PS3, which are all arranged in a-housing GG of the planetary power-shifting transmission 120. In this exemplary embodiment, all three planetary gear sets PS1, PS2, PS3 are formed as simple negative planetary gear sets, the respective ring gears HO1, HO2, HO3 of which, with carriers ST1, ST2, ST3 that are held down, rotate in a direction opposite to the sun gears SO1, SO2, SO3. The second and third planetary gear set PS2, PS3 are arranged in an axial direction in the order of "PS2, PS3", coaxially in a row, on the first shaft train WS1 of the two parallel shaft trains WS1, WS2.

A first spur gear ST3a of a third spur gear stage STS3 of the three spur gear stages STS2, STS3, STS4, a first spur gear ST4a of the fourth spur gear stage STS4 and a first spur gear ST2a of a second spur gear stage STS2 of the three spur gear stages STS2, STS3, STS4 are arranged, coaxially in a row, on the first shaft train WS1 in front of the second planetary gear set PS2. This gives rise to an order of "ST3a, ST4a, ST2a, PS2, PS3".

The input shaft AN is arranged on the first shaft train WS1, the output shaft AB is arranged on a second shaft train WS2 of the two parallel shaft trains WS1, WS2. Furthermore, the two shaft trains WS1, WS2 are connected to each other through the three spur gear stages STS2, STS3, STS4.

The shifting elements K1, K2, K3, K4 are formed as clutches, the two shifting elements B1, B2 are formed as brakes, and are hereinafter sometimes designated as such. Through a selective intervening of the six shifting elements K1, K2, K3, K4, B, B2, different transmission ratios can be brought about between the input shaft AN and the output shaft AB. In this manner, at least nine forward gears and at least one reverse gear are able to be realized.

The following describes a coupling of the individual elements of the three planetary gear sets PS1, PS2, PS3 with each other, at the three spur gear stages STS2, STS3, STS4 and at the input shaft AN and at the output shaft AB.

The planetary power-shifting transmission 120 features at least nine connection elements, which are designated with 1, 3, 4, 8, 9, 10, 11, 12 13. The connection elements 1, 3, 4, 8, 9, 10, 11, 12 13 may be formed as shafts, whereas, within the connection elements 1, 3, 4, 8, 9, 10, 11, 12 13, shifting elements, in particular clutches, may also be arranged, as described in more detail below.

As FIG. 9 shows, a sun gear SO2 of a second planetary gear set PS2 of the three planetary gear sets PS1, PS2, PS3 and the input shaft AN are connected to each other in a torque-proof manner with a first connection element 1. A ring gear HO3 of a third planetary gear set PS3 of the three planetary gear sets PS1, PS2, PS3 and the carrier ST2 of the second planetary gear set PS2 are connected to each other in a torque-proof manner with a third connection element 3. A ring gear HO2 of the second planetary gear set PS2 is connected to the first spur gear ST2a of the second spur gear stage STS2 with a fourth connection element 4. A second spur gear ST2b of the spur gear stage STS2 and the output shaft AB are connected with an eighth connection element 8. The fourth shifting element K4 is arranged in the eighth connection element 8. A first spur gear ST4a of the fourth spur gear stage STS4 is connected in a torque-proof manner to the ring gear HO2 of the second planetary gear set PS2 with a ninth connection element. The ring gear HO1 of the first planetary gear set PS1 is connected in a torque-proof manner to the output shaft AB with a tenth connection element 10. The carrier ST1 of the first planetary gear set PS1 is connected to the second spur gear ST4b of the fourth spur gear stage STS4 with an eleventh connection element 11. The sun gear SO1 of the first planetary gear set PS1 is connected to the second spur gear ST3b of the third spur gear stage with a twelfth connection element 12. The input shaft AN is, through the first shifting element K1, here the clutchK1, connected, or able to be coupled, to the first spur gear ST3a of the third spur gear stage STS3, with a thirteenth connection element 13.

The thirteenth connection element 13 features the first shifting element K1 of the six shifting elements K1, K2, K3, K4, B1, B2, whereas the first shifting element K1 is arranged in the power flow between the input shaft AN and first spur gear ST3a of the third spur gear set STS3. A second shifting element K2 of the six shifting elements K1, K2, K3, K4, B1, B2 is arranged in the power flow between the input shaft AN and a carrier ST3 of the third planetary gear set PS3. A third shifting element K3 of the six shifting elements K1 K3, K2, K3, K4, B1, B2 is arranged in the power flow between the fourth connection element 4 of the ring gear HO2 of the second planetary gear set PS2 with the first spur gear ST2a of the second spur gear stage STS2 and the carrier ST3 of the third planetary gear set PS3. The eighth connection element 8 features a fourth shifting element K4 of the six shifting elements K1, K2, K3, K4, B1, B2, whereas the fourth shifting element K4 is arranged in the power flow between the second spur gear ST2b of the second spur gear stage STS2 and the output shaft AB. A fifth shifting element B1, here the brake B1, of the six shifting elements K1, K2, K3, K4, B1, B2 is arranged in the power flow between the carrier ST3 of the third planetary gear set PS3 and a transmission housing GG. A sixth shifting element B2 of the six shifting elements K1, K2, K3, K4, B1, B2 is arranged in the power flow between the sun gear SO3 of the third planetary gear set PS3 and the transmission housing GG.

In order to save axial installation space, a gear set can be positioned on the output shaft AB. For this purpose, the gear set PS1 is offered above all. However, a spur gear stage is also required for this purpose. This option for the second main system is shown in FIGS. 9, 10 and 11. FIG. 9 shows a transmission scheme of the second main system with the first planetary gear set PS1 on the output shaft AB. Moreover, several arrangement variants are also possible for this system, as is shown in FIG. 10. FIG. 11 then shows an alternative exemplary positioning of the first planetary gear set PS1 on the output shaft AB.

FIG. 10 shows a schematic representation of an additional exemplary embodiment of the second main system of the multi-speed transmission 120, already described on the basis of FIG. 9. This comprises, for the second main system described on the basis of FIG. 9, equally effective blocking variants of the multi-speed transmission 120.

The transmission scheme shown in FIG. 10 corresponds to the transmission scheme of a multi-speed transmission 120 shown in FIG. 9, from which several equally effective transmission variants can be derived, whereas, for the first shifting element K1 or the clutchK1, there are four additional equally effective arrangement variants and, for the fourth shifting element K4 or the clutchK4, one additional arrangement variant is possible. In FIG. 10, the four arrangement variants for the clutchK1 are designated with A5, A6, A7, A8, the arrangement variant for the clutchK4 is designated with A9.

In a first arrangement variant A5, the clutchK1 is arranged in the twelfth connection element 12 between the second spur gear ST3b of the third spur gear set STS3 and the sun gear SO1 of the first planetary gear set PS1.

In a second arrangement variant A6, the clutchK1 is arranged in the tenth connection element 10 between the ring gear HO1 of the first planetary gear set PS1 and the output shaft AB.

In a third arrangement variant A7, the clutchK1 is arranged in the eleventh connection element 11 between the second spur gear ST4b of the fourth spur gear stage STS4 and the carrier ST1 of the first planetary gear set PS1.

In a fourth arrangement variant A8, the clutchK1 is arranged between the first spur gear ST4a of the fourth spur gear stage STS4 and the carrier ST2 of the second planetary gear set PS2.

For the clutchK4, in addition to the arrangement variant in the eighth connection element 8 between the output shaft AB and the second spur gear ST2b of the second spur gear stage STS2, another arrangement variant A9 arises; this corresponds to a great extent to the arrangement variant A4 shown in FIG. 4. Thereby, the clutchK4 is arranged in the fourth connection element 4 between the first spur gear ST2a of the second spur gear stage STS2 and the ring gear HO2 of the second planetary gear set PS2.

FIG. 10 shows one of the ten possible arrangement variants for the clutchesK1, K4, according to which each of the five arrangement variants for the clutchK1 can be combined with the two arrangement variants for the clutchK4.

Thus, FIG. 10 shows equally effective transmission variants or transmission schemes of arrangement variants for the clutchesK1, K4. As with the first main systems with all planetary sets on the input shaft AN, as shown in FIGS. 2 and 3-8, for the second main systems with one gear set on the output shaft AB, an entire set of transmission variants is also possible. These are mostly identical to the transmission variants of the first main system. However, based on the repositioning for the clutchK1, an additional arrangement variant is added. Moreover, by analogy to the first main system for the clutchesK1, K4, additional arrangements are also possible, without changing the function of the transmission 120. These arrangement options are shown in FIG. 10. Thus, four additional arrangement options (A5, A6, A7, A8) arise for the clutchK1. An additional arrangement option (A9) arises for the clutchK4.

FIG. 11 shows a transmission scheme of the multi-speed transmission 120 as the second main system in accordance with an additional exemplary embodiment of the present invention. Thereby, the first planetary gear stage PS1 is arranged on the output shaft AB.

Compared to the exemplary embodiment shown in FIGS. 9 and 10, the position of the planetary gear set PS1 and the connection of the third and the fourth spur gear stages STS3, STS4 varies. All transmission elements, connection elements, shafts, torque-proof connections, shifting elements and arrangement variants in the area of the first shaft train WS1 are identical to the exemplary embodiment shown in FIG. 10. In addition, the eighth and tenth connection element 8, 10 at the second shaft train WS2 correspond to the exemplary embodiment shown in FIG. 10. Compared to the exemplary embodiment shown in FIG. 10, the eleventh and the twelfth connection elements 11, 12 were changed.

The eleventh connection element 11 connects the sun gear SO1 of the first planetary gear set PS1 to the second spur gear ST4a of the fourth spur gear stage STS4. In the third arrangement variant designated in FIG. 10 as A7, the clutchK1 is arranged in the area of the eleventh connection element 11.

The twelfth connection element 12 connects the second spur gear ST3b of the spur gear stage STS3 to the ring gear HO1 of the first planetary gear set PS1. In the first arrangement variant designated in FIG. 10 as A5, the clutchK1 is arranged in the area of the twelfth connection element 12.

The exact geometric location of the transmission elements (clutches, gear sets, spur gears etc.) is flexible; thus, individual planetary gear sets, spur gears and clutches may be also interchanged or shifted, as long as binding ability is allowed for.

A hybridization of a multi-speed transmission in accordance with the invention is shown in FIGS. 12 and 13. In principle, in accordance with one of the described embodiments, an electric motor or other power source may be arranged on each shaft of a multi-speed transmission FIG. 12 shows a schematic representation of a power-shiftable multi-speed transmission 120, designed as the first main system, with a power source EM in accordance with one exemplary embodiment of the present invention. In accordance with this invention, the power source EM is designed as an electric motor EM, also called an electro-motor. This comprises a hybridization with the electric motor EM, which is directly on the input shaft AN of the multi-speed transmission 120 described on the basis of FIG. 2 and designed as the first main system.

In accordance with the exemplary embodiment of FIG. 12, the multi-speed transmission 120 known from FIG. 2 is expanded by the electric motor EM and an additional clutchK0 on the input shaft AN. In addition, in the first shaft train WS1, the electric motor EM, as a load source, and the clutchK0 are arranged between an internal combustion engine driving the input shaft AN, as shown for example in FIG. 1, and the electric motor EM. In an axial direction, on the first shaft train WS1, the clutchK0, the electric motor EM, the two spur gear stages STS1, STS2 and the three planetary gear sets PS1, PS2, PS3 are arranged, coaxially in a row, in the order of "K0, EM, PS1, STS1, STS2, PS2, PS3". The electric motor EM acts directly on the input shaft AN. The hybridization is possible with all exemplary embodiments shown and described in FIGS. 1-11. The link of the electric motor EM with the input shaft AN represents an exemplary arrangement variant. In principle, an electric motor EM, or another power source, may be arranged on each shaft of a planetary power-shifting transmission in accordance with the invention.

If, as described in FIG. 12, as an addition to the electric motor EM, the additional clutchK0 is placed between an internal combustion engine, as shown for example in FIG. 1, and the electric motor EM, it is possible to, as described for example on the basis of FIG. 3, drive all gears purely electrically, both forward and backward. For this purpose, the internal combustion engine is disconnected through the open clutchK0.

In addition to the hybridization with an electric motor EM directly on the input shaft AN, shown in FIG. 12, a hybridization with an electric motor EM axially parallel to the input shaft AN is also conceivable, as described on the basis of FIG. 13.

FIG. 13 shows a schematic representation of a power-shiftable multi-speed transmission 120 with a power source EM in accordance with one exemplary embodiment of the present invention. In a manner corresponding to the embodiment described on the basis of FIG. 12, the power source EM is designed as an electric motor EM. This comprises a hybridization with an electric motor EM, which is arranged axially parallel to the input shaft AN of the multi-speed transmission 120 described on the basis of FIG. 6.

In the exemplary embodiment of FIG. 13, compared to the exemplary embodiment shown in FIG. 12, the electric motor EM is not connected to the first connection element in a directly torque-proof manner; rather, it is coupled to the first connection element through a fifth spur gear stage. The electric motor EM is axially parallel to the shaft trains on which the side of the first shaft train opposite the second shaft train is arranged. The arrangement of the planetary gear sets PS1, PS2, PS3 and the spur gear stages STS1, STS2, along with the connections or blocking with each other, correspond to the exemplary embodiment of the present invention shown in FIG. 6.

The arrangements of the gear sets and clutches described above enables the fact that a multi-speed transmission in accordance with the described concept may also be used as a front-transverse system. This comes from the multi-speed transmission with a small number of planetary sets.

The exemplary embodiments described and shown in the figures are only selected as examples. Different embodiments may be combined with one another, completely or in reference to individual characteristics. Moreover, an embodiment may be supplemented by characteristics of a further embodiment. If one embodiment comprises an "and/or" link between a first characteristic and a second characteristic, this is to be read in such a manner that the embodiment in accordance with one form of execution features both the first characteristic and the second characteristic, and in accordance with an additional form of execution features only the first characteristic or only the second characteristic. In addition to the embodiments described by example, there is an additional spatial arrangement of the planetary sets and the shifting elements in and of themselves and with respect to each other, which does not affect the functioning of the described transmission.

In particular, for the presented or described exemplary embodiments of the family of transmissions with the same transmission scheme, depending on the stationary transmission ratio of the individual planetary sets, various gear steps may arise, such that an application-specific or vehicle-specific variation is enabled. It is also possible to provide additional freewheels at each suitable location of the multi-speed transmission, for example between one shaft and the housing, or, if applicable, in order to connect two shafts. In accordance with the invention, an axle differential and/or a distributor differential may be arranged on the input side or on the output side. The multi-speed transmission in accordance with the invention may be further formed with a corresponding advantage, for example through an arrangement of a torsional vibration damper between the drive motor and the transmission. Furthermore, if necessary, the input shaft AN may be separated from the drive motor by a coupling element, whereas a hydrodynamic converter, a hydraulic clutch, a dry starting clutch, a wet starting clutch, a magnetic powder clutch or a centrifugal clutch may be used as the coupling element. It is also possible to arrange such a start-up element in the direction of the power flow behind the transmission, whereas, in this case, the input shaft AN is permanently connected to the crank shaft of the motor.

In an additional embodiment of the invention that is not shown, in addition to the hybridization of a multi-speed transmission in accordance with the invention, a wear-free brake, such as a hydraulic or electric retarder, may be arranged at each shaft, preferably at the input shaft AN or the output shaft AB; this is of particular importance for use in commercial vehicles. Furthermore, a power take-off may be provided for the drive of additional power units at each shaft, preferably at the input shaft AN or the output shaft AB.

Modifications and variations can be made to the embodiments illustrated or described herein without departing from the scope and spirit of the invention as set forth in the appended claims.

REFERENCE SIGNS

100 Vehicle
110 Motor
120 Planetary power-shifting transmission
AN Input shaft
AB Output shaft
WS1 First shaft train
WS2 Second shaft train
K1 Shifting element, clutch
K2 Shifting element, clutch
K3 Shifting element, clutch
K4 Shifting element, clutch
B1 Shifting element, brake
B2 Shifting element, brake
PS1 First planetary gear set
PS2 Second planetary gear set
PS3 Third planetary gear set
SO1 Sun gear
SO2 Sun gear
SO3 Sun gear
HO1 Ring gear
HO2 Ring gear
HO3 Ring gear
ST1 Carrier
ST2 Carrier
ST3 Carrier
STS1 First spur gear stage
STS2 Second spur gear stage
STS3 Third spur gear stage
ST1a First spur gear
ST1b Second spur gear
ST2a First spur gear
ST2b Second spur gear
ST3a First spur gear
ST3b Second spur gear
ST4a First spur gear
ST4b Second spur gear
1 First connection element
2 Second connection element
3 Third connection element
4 Fourth connection element
5 Fifth connection element
6 Sixth connection element
7 Seventh connection element
8 Eighth connection element
9 Ninth connection element
10 Tenth connection element
11 Eleventh connection element
12 Twelfth connection element
13 Thirteenth connection element
GG Transmission housing
EM Power source

The invention claimed is:

1. A multi-speed transmission, comprising:
an input shaft;
an output shaft;
a pair of parallel shaft trains having a first shaft train and a second shaft train;
a plurality of spur gear stages having a first spur gear stage and a second spur gear stage, the parallel shaft trains of the pair of parallel shaft trains connectable to each other with the plurality of spur gear stages;
a plurality of planetary gear sets having a first planetary gear set, a second planetary gear set and a third planetary gear set, the first, second and third planetary gear sets each having a sun gear, a ring gear and a carrier with a plurality of planet gears; and
a plurality of shifting elements having a first brake, a second brake, a first clutch, a second clutch, a third clutch and a fourth clutch, each shifting element of the plurality of shifting elements configured for selective actuation in order to adjust a transmission ratio between the input shaft and the output shaft,
wherein the first, second and third planetary gear sets and the input shaft are arranged on the first shaft train of the pair of parallel shaft trains, the output shaft is arranged on the second shaft train the pair of parallel shaft trains, the input shaft is connected to the sun gear of the second planetary gear set, the sun gear of the first planetary gear set is connected to the carrier of the second planetary gear set, the ring gear of the third planetary gear set is connected to the carrier of the second planetary gear set, the ring gear of the second planetary gear set is connected to a first spur gear of the second spur gear stage, a first spur gear of the first spur gear stage is connected to the ring gear of first planetary gear set, a second spur gear of the first spur gear stage is connected to the output shaft, the carrier of the first planetary gear set is connected to the input shaft, a second spur gear of the second spur gear stage is connected to the output shaft, the first brake is configured for selectively coupling the carrier of the third planetary gear set to a transmission housing, the second brake is configured for selectively coupling the sun gear of the third planetary gear set to the transmission housing, the second clutch is configured for selectively coupling the input shaft to the carrier of the third planetary gear set, and the third clutch is configured for selectively coupling the ring gear of the second planetary gear set and the first spur gear of the second spur gear stage to the carrier of the third planetary gear set.

2. The multi-speed transmission of claim 1, wherein the first clutch is configured for selectively coupling the carrier of the first planetary gear set to the input shaft.

3. The multi-speed transmission of claim 1, wherein the first clutch is configured for selectively coupling the sun gear of the first planetary gear set to the carrier of the second planetary gear set.

4. The multi-speed transmission of claim 1, wherein the first clutch is configured for selectively coupling the first spur gear of the first spur gear stage to the ring gear of first planetary gear set.

5. The multi-speed transmission of claim 1, wherein the first clutch is configured for selectively coupling the second spur gear of the first spur gear stage to the output shaft.

6. The multi-speed transmission of claim 1, further comprising an electric motor coupled to the input shaft.

7. The multi-speed transmission of claim 1, wherein at least one of planetary gear sets of the plurality of planetary gear sets is a negative planetary gear set.

8. The multi-speed transmission of claim 1, wherein the multi-speed transmission has at least nine forward gears and one reverse gear, the second brake and the third and fourth clutches are closed in a first forward gear of the nine forward gears, the second, third and fourth clutches are closed in a second forward gear of the nine forward gears, the second brake and the second and fourth clutches are closed in a third forward gear of the nine forward gears, the first, second and fourth clutches are closed in a fourth forward gear of the nine forward gears, the second brake and the first and second clutches are closed in a fifth forward gear of the nine forward gears, the first, second and third clutches are closed in a sixth forward gear of the nine forward gears, the second brake and the first and third clutches are closed in a seventh forward gear of the nine forward gears, the first brake and the first and third clutches are closed in an eighth forward gear of the nine forward gears, and the first and second brakes and the first clutch are closed in a ninth forward gear of the nine forward gears.

9. A multi-speed transmission, comprising:
an input shaft;
an output shaft;
a pair of parallel shaft trains having a first shaft train and a second shaft train;
a plurality of spur gear stages having a first spur gear stage and a second spur gear stage, the parallel shaft trains of the pair of parallel shaft trains connectable to each other with the plurality of spur gear stages;
a plurality of planetary gear sets having a first planetary gear set, a second planetary gear set and a third planetary gear set, the first, second and third planetary gear sets each having a sun gear, a ring gear and a carrier with a plurality of planet gears; and
a plurality of shifting elements having a first brake, a second brake, a first clutch, a second clutch, a third clutch and a fourth clutch, each shifting element of the plurality of shifting elements configured for selective actuation in order to adjust a transmission ratio between the input shaft and the output shaft,
wherein the second and third planetary gear sets and the input shaft are arranged on the first shaft train of the pair of parallel shaft trains, the first planetary gear set and the output shaft are arranged on the second shaft train of the pair of parallel shaft trains, the sun gear of the second planetary gear set is connected to the input shaft, the ring gear of the third planetary gear set is connected to the carrier of the second planetary gear set, the ring gear of the second planetary gear set is connected to a first spur gear of the first spur gear stage, a second spur gear of the first spur gear stage is connected to the output shaft, the carrier of the second planetary gear set is connected to a first spur gear of a third spur gear stage, the output shaft is connected to the ring gear of the first planetary gear set, a first spur gear of the second spur gear stage is connected to the input shaft, the first brake is configured for selectively coupling the carrier of the third planetary gear set to a transmission housing, the second brake is configured for selectively coupling the sun gear of the third planetary gear set to the transmission housing, the second clutch is configured for selectively coupling the input shaft to the carrier of the third planetary gear set, and the third clutch is configured for selectively coupling the carrier of the third planetary gear set and the first spur gear of the first spur gear stage to the ring gear of the second planetary gear set.

10. The multi-speed transmission of claim 1, wherein a second spur gear of the third spur gear stage is connected to the carrier of the first planetary gear set, and a second spur gear of the second spur gear stage is connected to the sun gear of the first planetary gear set.

11. The multi-speed transmission of claim 10, wherein the first clutch is configured for selectively coupling the second spur gear of the third spur gear stage to the carrier of the first planetary gear set or the first clutch is configured for selectively coupling the second spur gear of the second spur gear stage to the sun gear of the first planetary gear set.

12. The multi-speed transmission of claim 10, wherein the first clutch is configured for selectively coupling the output shaft to the ring gear of the first planetary gear set or the first clutch is configured for selectively coupling the carrier of the second planetary gear set to the first spur gear of the third spur gear stage.

13. The multi-speed transmission of claim 1, wherein a second spur gear of the third spur gear stage is connected to the sun gear of the first planetary gear set, and a second spur gear of the second spur gear stage is connected to the carrier of the first planetary gear set.

14. The multi-speed transmission of claim 13, wherein the first clutch is configured for selectively coupling the second spur gear of the third spur gear stage to the sun gear of the first planetary gear set or the first clutch is configured for selectively coupling the second spur gear of the second spur gear stage to the carrier of the first planetary gear set.

15. The multi-speed transmission of claim 13, wherein the first clutch is configured for selectively coupling the output shaft to the ring gear of the first planetary gear set or the first clutch is configured for selectively coupling the carrier of the second planetary gear set to the first spur gear of the third spur gear stage.

16. The multi-speed transmission of claim 9, wherein the first clutch is configured for selectively coupling the first spur gear of the second spur gear stage to the input shaft.

17. The multi-speed transmission of claim 9, wherein the fourth clutch is configured for selectively coupling the second spur gear of the first spur gear stage to the output shaft.

18. The multi-speed transmission of claim 9, wherein the fourth clutch is configured for selectively coupling the ring gear of the second planetary gear set to the first spur gear of the first spur gear stage.

19. The multi-speed transmission of claim 9, further comprising an electric motor coupled to the input shaft.

20. The multi-speed transmission of claim 9, wherein at least one of planetary gear sets of the plurality of planetary gear sets is a negative planetary gear set.

21. The multi-speed transmission of claim 9, wherein the multi-speed transmission has at least nine forward gears and one reverse gear, the second brake and the third and fourth clutches are closed in a first forward gear of the nine forward gears, the second, third and fourth clutches are closed in a second forward gear of the nine forward gears, the second brake and the second and fourth clutches are closed in a third forward gear of the nine forward gears, the first, second and fourth clutches are closed in a fourth forward gear of the nine forward gears, the second brake and the first and second clutches are closed in a fifth forward gear of the nine forward gears, the first, second and third clutches are closed in a sixth forward gear of the nine forward gears, the second brake and the first and third clutches are closed in a seventh forward gear of the nine forward gears, the first brake and the first and third clutches are closed in an eighth forward gear of the nine forward gears, and the first and second brakes and the first clutch are closed in a ninth forward gear of the nine forward gears.

* * * * *